United States Patent
Park et al.

(10) Patent No.: US 11,146,568 B2
(45) Date of Patent: *Oct. 12, 2021

(54) METHOD AND APPARATUS FOR PROVIDING PROFILE

(71) Applicant: Samsung Electronics Co., Ltd., Suwon-si (KR)

(72) Inventors: Jonghan Park, Bucheon-si (KR); Duckey Lee, Seoul (KR); Hyewon Lee, Seoul (KR); Sangsoo Lee, Yongin-si (KR); Taesun Yeom, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,673

(22) Filed: May 22, 2020

(65) Prior Publication Data

US 2020/0287907 A1    Sep. 10, 2020

Related U.S. Application Data

(63) Continuation of application No. 15/570,561, filed as application No. PCT/KR2016/004818 on May 9, 2016, now Pat. No. 10,666,660.

(Continued)

(51) Int. Cl.
*H04L 29/06* (2006.01)
*H04W 12/06* (2021.01)
(Continued)

(52) U.S. Cl.
CPC ........ *H04L 63/102* (2013.01); *H04L 63/0281* (2013.01); *H04L 63/0853* (2013.01);
(Continued)

(58) Field of Classification Search
CPC ... H04L 63/102; H04L 63/0281; H04L 67/30; H04L 63/0853; H04L 29/06; H04L 29/08;
(Continued)

(56) References Cited

U.S. PATENT DOCUMENTS 8,965,366 B1    2/2015   Somayajula et al.
9,811,643 B2    11/2017  Lin
(Continued)

FOREIGN PATENT DOCUMENTS

CN    101651714 A    2/2010
CN    103428676 A    12/2013
(Continued)

OTHER PUBLICATIONS

European Office Action dated Nov. 30, 2018 issued in European Patent Application No. 16789654.7.
(Continued)

*Primary Examiner* — Quazi Farooqui
(74) *Attorney, Agent, or Firm* — Jefferson IP Law, LLP

(57) ABSTRACT

Provided are a communication method and system that integrate 5G communication systems with IoT technologies to support higher data rates after 4G systems. The present disclosure is based on 5G communication technologies and IoT related technologies, and may be applied to intelligent services (e.g. smart homes, smart buildings, smart cities, smart or connected cars, health care, digital education, retail, and security and safety).

There is provided a method of profile downloading for a terminal. The method may include: transmitting a first profile download request to a profile providing server; receiving unencrypted first profile information from the profile providing server; checking whether there is an input for consenting to profile downloading after receiving unencrypted profile information; and determining whether to (Continued)

download an encrypted profile on the basis of the check result. There is also provided a terminal capable of performing the above method. In addition, there are provided a profile providing server and an operation method therefor for delivering a profile to the above terminal.

20 Claims, 14 Drawing Sheets

Related U.S. Application Data

(60) Provisional application No. 62/158,067, filed on May 7, 2015.

(51) Int. Cl.
*H04W 12/08* (2021.01)
*H04L 29/08* (2006.01)
*H04W 8/20* (2009.01)
*H04W 12/30* (2021.01)
*G06F 8/61* (2018.01)
*H04W 84/04* (2009.01)

(52) U.S. Cl.
CPC ............ *H04L 67/30* (2013.01); *H04W 8/205* (2013.01); *H04W 12/06* (2013.01); *H04W 12/08* (2013.01); *H04W 12/35* (2021.01); *G06F 8/61* (2013.01); *H04W 84/042* (2013.01)

(58) Field of Classification Search
CPC . H04W 12/0023; H04W 8/205; H04W 12/08; H04W 12/06; H04W 84/042; G06F 8/61
See application file for complete search history.

(56) References Cited

U.S. PATENT DOCUMENTS

| | | |
|---|---|---|
| 2001/0028660 A1 | 10/2001 | Carolan et al. |
| 2011/0283333 A1 | 11/2011 | Ukkadam |
| 2011/0302574 A1 | 12/2011 | Yoshikawa |
| 2012/0190354 A1* | 7/2012 | Merrien ................ H04L 63/083 |
| | | 455/422.1 |
| 2012/0208597 A1 | 8/2012 | Billman |
| 2012/0254949 A1* | 10/2012 | Mikkonen ............ H04W 12/06 |
| | | 726/4 |
| 2012/0260090 A1 | 10/2012 | Hauck et al. |
| 2013/0283047 A1 | 10/2013 | Merrien et al. |
| 2014/0031012 A1 | 1/2014 | Park et al. |
| 2014/0219447 A1* | 8/2014 | Park ..................... H04W 12/08 |
| | | 380/247 |
| 2014/0237101 A1 | 8/2014 | Park |
| 2015/0121487 A1 | 4/2015 | Chastain et al. |
| 2015/0282058 A1* | 10/2015 | Forssell ................ H04W 48/18 |
| | | 455/552.1 |
| 2015/0350881 A1* | 12/2015 | Weiss .................... H04W 12/04 |
| | | 455/558 |
| 2016/0057725 A1 | 2/2016 | Suh |
| 2016/0241398 A1 | 8/2016 | Lewis |

FOREIGN PATENT DOCUMENTS

| | | |
|---|---|---|
| CN | 103873243 A | 6/2014 |
| EP | 2 747 466 A1 | 6/2014 |
| KR | 10-2013-0026351 A | 3/2013 |
| WO | 2014/171707 A1 | 10/2014 |

OTHER PUBLICATIONS

Chinese Office Action dated Jun. 1, 2020, issued in Chinese Application No. 201680026492.9.

* cited by examiner

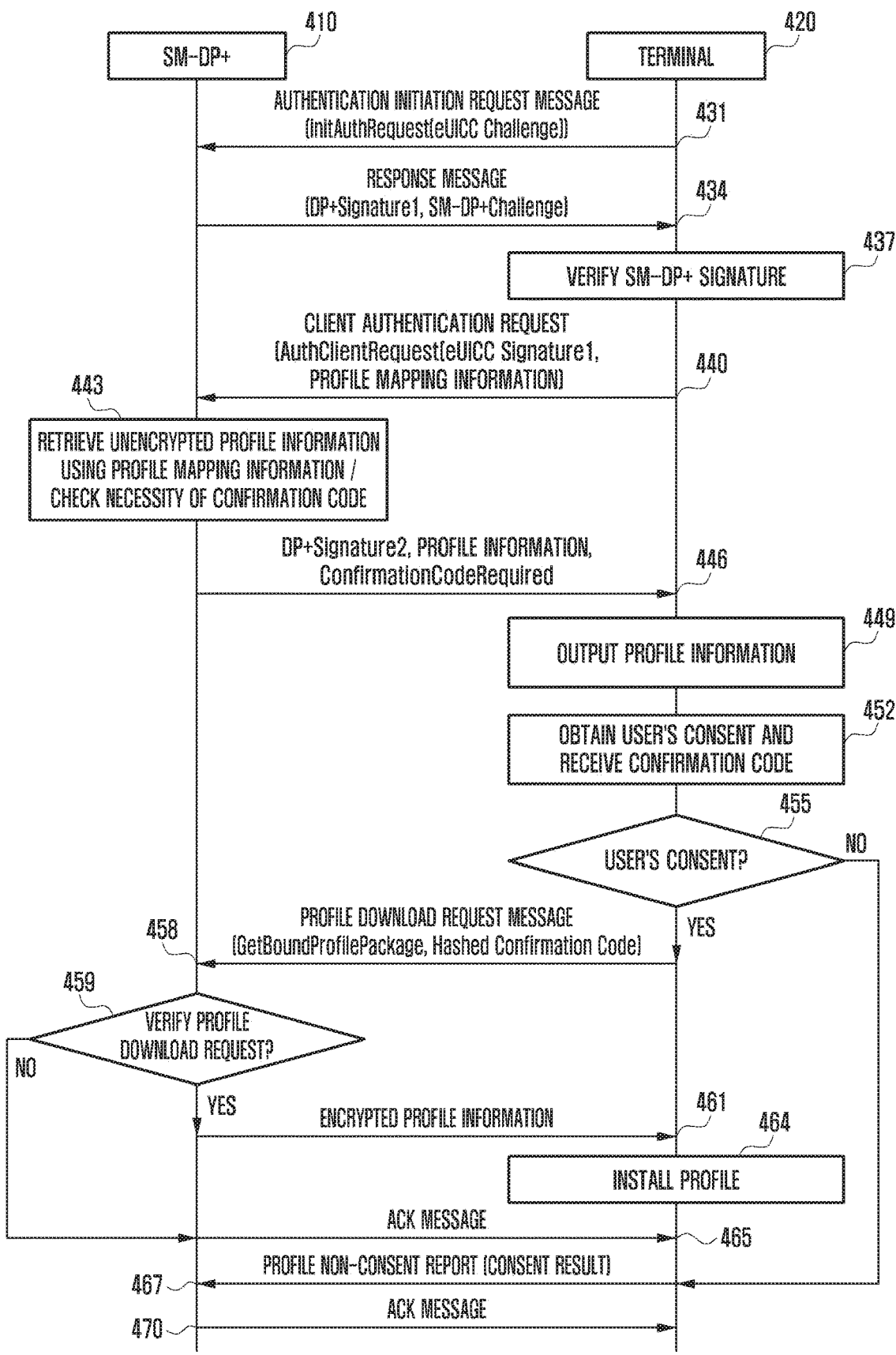

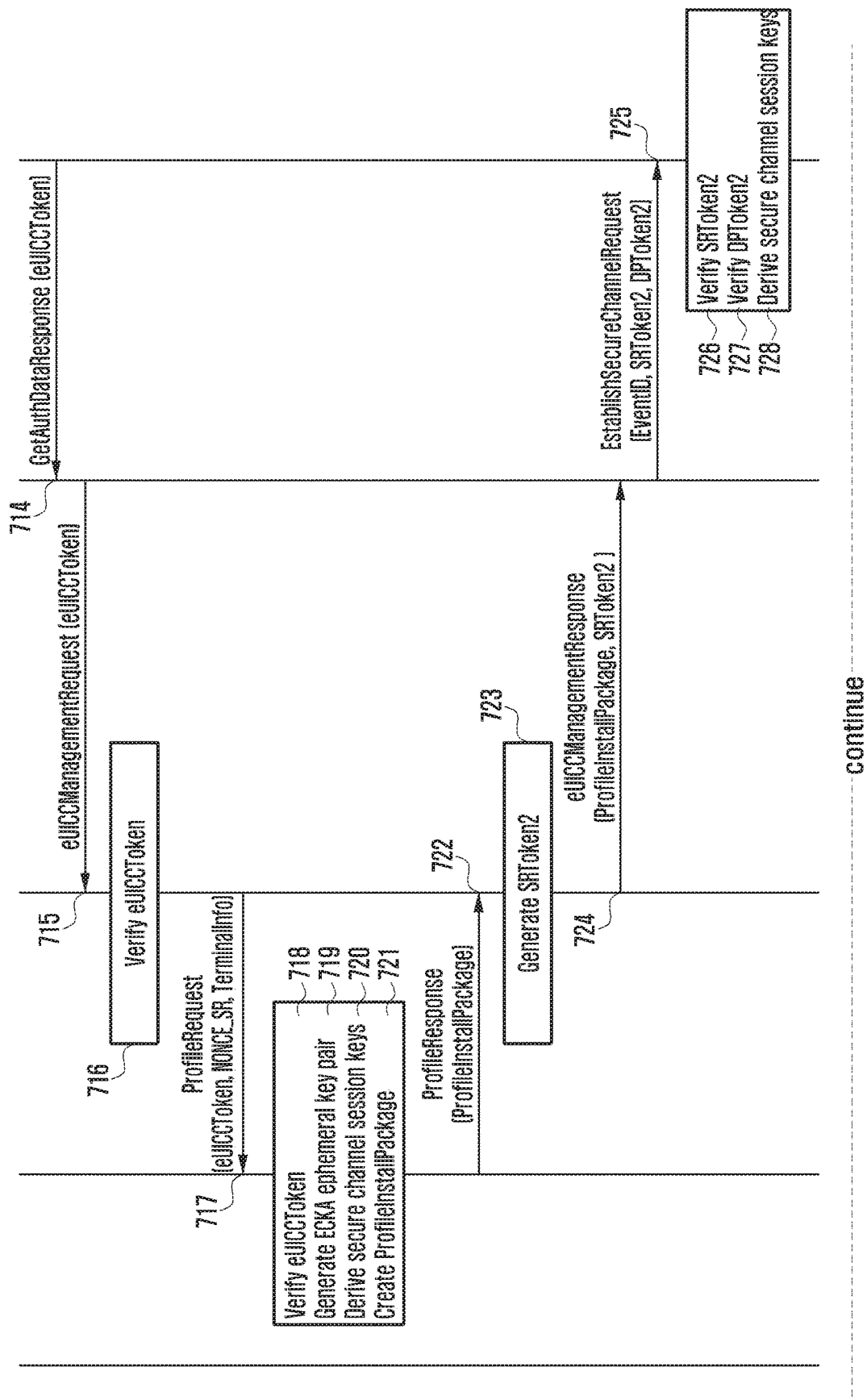
FIG. 7B -continue-

US 11,146,568 B2

METHOD AND APPARATUS FOR PROVIDING PROFILE

CROSS-REFERENCE TO RELATED APPLICATION(S)

This application is a continuation application of prior application Ser. No. 15/570,561, filed on Oct. 30, 2017, which has issued as U.S. Pat. No. 10,666,660 on May 26, 2020 and is a U.S. National Stage application under 35 U.S.C. § 371 of an International application number PCT/KR2016/004818, filed on May 9, 2016, which was based on and claimed priority under 35 U.S.C § 119(e) of a U.S. Provisional application Ser. No. 62/158,067, filed on May 7, 2015, in the U.S. Patent and Trademark Office, the disclosure of which is incorporated by reference herein in its entirety.

TECHNICAL FIELD

The present invention relates to a method and apparatus for establishing communication connectivity by downloading and installing communication services in a terminal in a communication system. More particularly, the present invention relates to a method and apparatus for downloading and installing a profile in real time in a communication system.

BACKGROUND ART

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system". To achieve higher data rates, 5G communication systems consider utilization of the mmWave band (e.g. 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human-centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing described above may be an instance of convergence of 5G communication technology and IoT technology.

DISCLOSURE OF INVENTION

Technical Problem

An aspect of the present invention is to provide a method and apparatus that enable a terminal to select a communication service and establish communication connectivity in a communication system. Another aspect of the present invention is to provide a method and apparatus that enable a terminal to download a profile in real time so as to establish communication connectivity in a communication system. Another aspect of the present invention is to provide a method and apparatus that provide a terminal with a profile.

Solution to Problem

In accordance with an aspect of the present invention, there is provided a terminal in a wireless communication system. The terminal may include: a transceiver to receive an encrypted profile and unencrypted profile information from the SM-DP+ or SM-SR+; a display to display information on a profile related to the unencrypted profile information; a user interface (UI) to obtain user's consent to profile reception wherein displaying the information and obtaining user's consent are performed before receiving the encrypted profile during a profile download procedure; and a controller to determine whether to continue or terminate the profile download procedure according to the obtained user's consent.

In accordance with another aspect of the present invention, there is provided an SM-DP+ in a wireless communication system. The SM-DP+ may include a controller and a transceiver that generate unencrypted profile information and an encrypted profile during a profile download procedure, and deliver the encrypted profile to a terminal only when a proper profile download request is received from the terminal after the unencrypted profile information is sent to the terminal.

In accordance with another aspect of the present invention, there is provided a terminal in a wireless communication system. The terminal may receive an encrypted profile and unencrypted profile information from the SM-DP+ or SM-SR+. The terminal may include a display, a UI, a controller, and a transceiver wherein information on a profile related to the unencrypted profile information is displayed on the display, wherein information indicating necessity of a confirmation code is displayed on the display according to a confirmation code required indication among the information received from the SM-DP+ during a profile download procedure under the control of the controller, wherein the user may enter a confirmation code through the UI separately from or together with the display, wherein the controller performs a hash operation on the input confirmation code and a random value received from the SM-DP+ or SM-SR+ during profile reception, and the transceiver transmits the hash result to the SM-DP+ or SM-SR+.

In accordance with another aspect of the present invention, there is provided an SM-DP+ in a wireless communication system. The SM-DP+ may include a storage, a controller, and a transceiver wherein information indicating necessity of a confirmation code during profile downloading and confirmation code information are stored in the storage, wherein the information indicating necessity of a confirmation code is read from the storage and sent to a terminal wishing to download a profile through the transceiver, and wherein, when a confirmation code is required, the controller compares the hash result received from the terminal with the hash result computed by the SM-DP+ using the confirmation code stored in the SM-DP+ and a random value sent to the terminal, and stops delivery of an encrypted profile to the terminal if the hash results are not identical.

In accordance with another aspect of the present invention, there is provided a method of profile downloading for a terminal. The method may include: transmitting a first profile download request to a profile providing server; receiving unencrypted first profile information from the profile providing server; checking whether there is an input for consenting to profile downloading after receiving unencrypted profile information; and determining whether to download an encrypted profile on the basis of the check result.

In accordance with another aspect of the present invention, there is provided a method of operation for a profile providing server. The method may include: receiving a first profile download request; transmitting unencrypted first profile information to a terminal; receiving a second profile download request including information indicating user's consent to profile downloading from the terminal; and transmitting encrypted second profile information to the terminal.

Aspects, features or objects of the present invention are not limited to those described above. Other aspects and salient features of the present invention will become apparent to those skilled in the art from the following detailed description.

Advantageous Effects of Invention

In a feature of the present invention, when the terminal attempts to download a profile from the communication system for installation, unencrypted profile information is sent to the terminal before actually delivering the encrypted profile to the terminal so that the user can decide whether to use the profile. Hence, it is possible to prevent the user from downloading an undesired profile or an encrypted profile not to be used, thereby reducing waste of number resources such as a profile or IMSI stored in a profile.

In another feature of the present invention, when the terminal attempts to download a profile from the communication system for installation, a confirmation code that is sent by the communication company to the user via a separate means is retrieved before the encrypted profile is delivered to the terminal, and the encrypted profile is actually delivered to the terminal only if the received confirmation code matches a confirmation code input by the user. Hence, it is possible to prevent erroneous installation of a profile. It is also possible to prevent the user from downloading an undesired profile or an encrypted profile not to be used, thereby reducing waste of number resources such as a profile or IMSI stored in a profile.

BRIEF DESCRIPTION OF DRAWINGS

FIG. 4 illustrates a procedure for downloading a profile using a confirmation code according to an embodiment of the present invention.

FIGS. 7A to 7C illustrate a procedure for downloading a profile according to an embodiment of the present invention.

MODE FOR THE INVENTION

Figure 1:
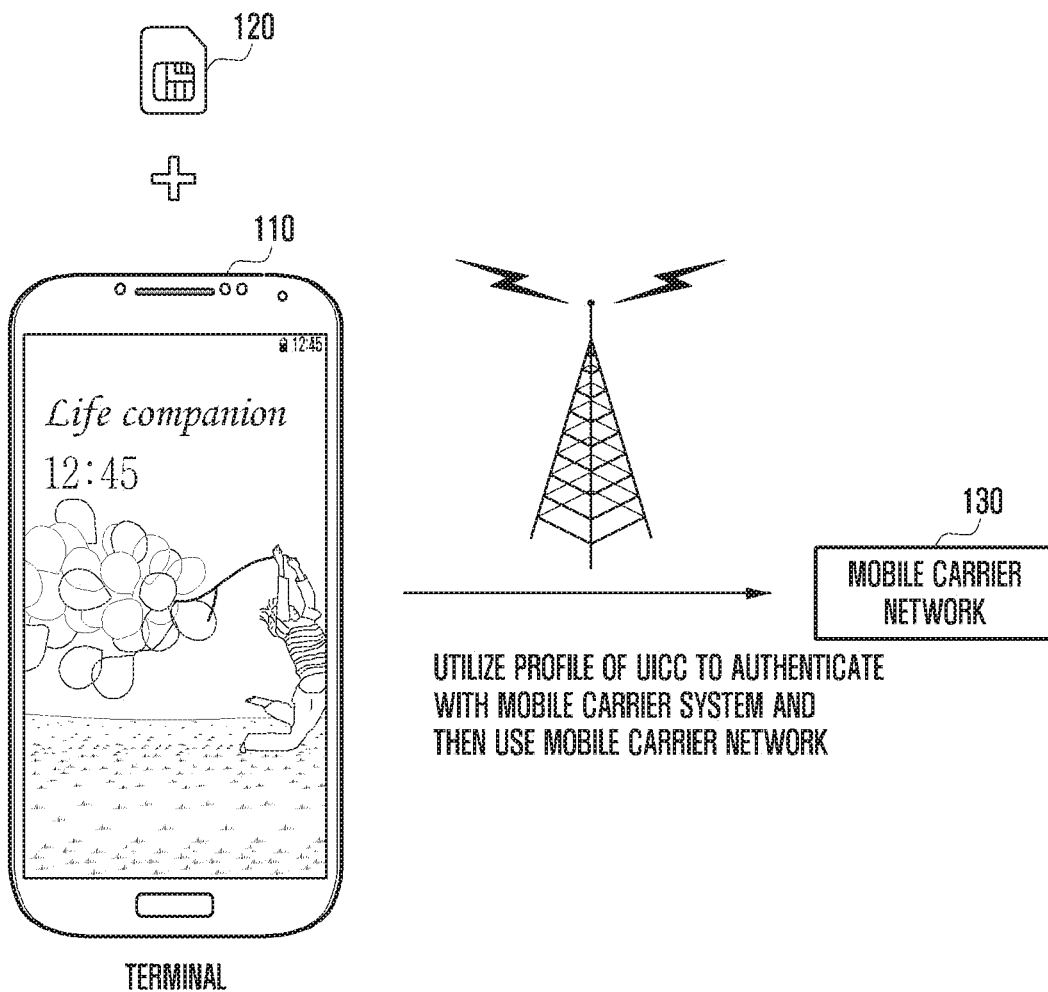
FIG. 1 depicts a procedure for the terminal using a UICC embedding a fixed profile to connect to a mobile communication network.

Hereinafter, embodiments of the present invention are described in detail with reference to the accompanying drawings.

Descriptions of functions and structures well known in the art and not directly related to the present invention may be omitted to avoid obscuring the subject matter of the present invention.

Particular terms may be defined to describe the invention and the usage of a specific term may be changed without departing from the spirit of the invention. Accordingly, the meaning of specific terms or words used herein should be construed in accordance with the spirit of the present invention.

A universal integrated circuit card (UICC) is a smart card inserted into a mobile communication terminal or the like and is also called a UICC card. The UICC may include an access control module for connecting to the network of a mobile network operator. Such an access control module may include a universal subscriber identity module (USIM), a subscriber identity module (SIM), and an IP multimedia service identity module (ISIM). A UICC containing a USIM is commonly referred to as a USIM card. Similarly, a UICC containing a SIM is commonly referred to as a SIM card. In the following description, the SIM card will be used as a collective term including a UICC card, a USIM card, and a UICC including an ISIM. That is, if a specific description applies to the SIM card, it can be equally applied to the USIM card, ISIM card, and general UICC card.

The SIM card stores personal information of a mobile subscriber, and performs subscriber authentication and generates traffic security keys when accessing a mobile communication network, thereby enabling secure usage of mobile communication.

The SIM card is generally manufactured as a dedicated card for a specific mobile network operator at the time proposed in the present invention according to the request of the mobile network operator. At the time of manufacture, authentication information for accessing the network of the corresponding operator, for example, a USIM application and an international mobile subscriber identity (IMSI), K values, and OPc values are stored in advance in the SIM card. The manufactured SIM card is delivered to the mobile network operator and the mobile network operator may provide the SIM card to a subscriber. Later, if necessary, management of the application in the UICC (e.g. installation, modification, deletion) can be performed by using OTA (over the air) technology. The subscriber can insert the UICC card into their mobile communication terminal and use network and application services of the mobile network operator. For terminal replacement, the UICC card may be moved from the existing terminal to the new terminal, so that the authentication information, mobile phone number, personal phone book and the like stored in the UICC card can be directly used in the new terminal.

However, the SIM card is inconvenient for the user of the mobile communication terminal to receive a service from another mobile network operator. The user of the mobile communication terminal has to physically acquire a SIM card to receive a service from another mobile network operator. For example, when traveling to another country, to receive a local mobile communication service, it is required to purchase a local SIM card. The roaming service may relieve such inconvenience to some extent, but the fee is expensive and the user may be unable to receive the service if there is no contract between the mobile network operators.

Meanwhile, when the SIM module is remotely downloaded and installed in the UICC card, this inconvenience can be largely relieved. That is, at a desired point in time, the user may download the SIM module associated with a mobile communication service to be used to the UICC card. In the UICC card, a plurality of SIM modules may be downloaded and installed, and only one of the SIM modules may be selected and used. Such a UICC card may be fixed to or not be fixed to the terminal. Particularly, the UICC that is fixed to the terminal is called the embedded UICC (eUICC). Typically, the eUICC refers to a UICC card that is fixed to the terminal and enables remote downloading and selection of the SIM module. In the description, a UICC card that allows SIM modules to be remotely downloaded and selected is generally referred to as eUICC. That is, the eUICC refers to a UICC card that allows SIM modules to be remotely downloaded and selected and that may be fixed to or not be fixed to the terminal. In the description, the downloaded SIM module information is collectively referred to as "eUICC profile".

First, the terms used in the description are defined.

In the description, the term "UICC" refers to a smart card chip that is inserted in a mobile communication terminal for usage, and that stores personal information of the mobile subscriber such as authentication information for network access, phonebook and SMS messages, and that performs subscriber authentication and generates traffic security keys when access is made to a mobile communication network such as GSM, WCDMA or LTE to thereby enable secure usage of mobile communication. The UICC may store a communication application such as SIM, USIM or ISIM according to the type of the mobile communication network to which the subscriber makes access, and also provides a high level security function for installing various user applications such as electronic wallet, ticketing and passport.

In the description, the "embedded UICC (eUICC)" refers to a security module in the form of a chip that is embedded in a terminal in a non-replaceable manner. The eUICC allows a profile to be downloaded and installed via OTA (over the air) technology. In the description, the eUICC may refer to a UICC that allows a profile to be downloaded and installed.

In the description, the scheme for downloading and installing a profile in the eUICC via OTA may be applied to a removable UICC that can be inserted into and removed from the terminal That is, embodiments of the present invention may be applied to a UICC that allows a profile to be downloaded and installed via OTA.

In the description, the term "UICC" may be used interchangeably with the term "SIM", and the term "eUICC" may be used interchangeably with the term "eSIM".

In the description, the term "profile" may refer to a software package stored in the UICC that is composed of an application, file system, and authentication key.

In the description, the term "USIM profile" may indicate a profile or a software package composed of information contained in the USIM application of a profile.

In the description, a "profile providing server" may be indicated by subscription manager data preparation (SM-DP), subscription manager data preparation plus (SM-DP+), off-card entity of profile domain, profile encryption server, profile generation server, profile provisioner (PP), profile provider, or profile provisioning credentials holder (PPC holder).

In the description, a "profile information transfer server" may be indicated by the discovery and push function (DPF) or the subscription manager discovery service (SM-DS).

In the description, a "profile management server" may be indicated by subscription manager secure routing (SM-SR), subscription manager secure routing plus (SM-SR+), off-card entity of eUICC profile manager, or profile management credentials holder (PMC holder), or eUICC manager (EM).

In the description, the functionality of the profile providing server may include the functionality of the profile management server. In the following description on various embodiments, the operation of the profile providing server may be performed by the profile management server. Likewise, the operation of the profile management server or SM-SR may also be performed by the profile providing server.

The term "terminal" used in the description may refer to a mobile station (MS), user equipment (UE), user terminal (UT), wireless terminal, access terminal (AT), subscriber unit, subscriber station (SS), wireless device, wireless communication device, wireless transmit/receive unit (WTRU), mobile node, mobile, or the like. Various examples of the terminal may include devices having a wireless communication function, such as a cellular phone, a smartphone, a personal digital assistant (PDA), a wireless modem, a portable computer, a photographing apparatus like a digital camera, a gaming console, a home appliance for storing and playing music, an internet home appliance capable of wireless internet access and browsing, and a portable unit or terminal having a combination of the above functions. Further, the terminal may include, but not limited to, a machine-to-machine (M2M) terminal and a machine-type-communication (MTC) terminal/device. In the description, the terminal may also be described as an electronic device.

In the description, an electronic device may embed a UICC that enables downloading and installation of a profile. If a UICC is not embedded in the electronic device, the UICC physically separated from the electronic device may be inserted into the electronic device and connected to the electronic device. For example, the UICC can be inserted in the form of a card into the electronic device. Here, the electronic device may be a terminal, and the terminal may include a UICC that allows a profile to be downloaded and installed. The UICC may be embedded in the terminal; and when the UICC is separated from the terminal, it may be inserted into the terminal and connected thereto. For example, the UICC that allows a profile to be downloaded and installed may be referred to as eUICC.

In the description, a profile identifier may be referred to as a profile ID, integrated circuit card ID (ICCID), or parameter matching an issuer security domain profile (ISD-P) or a profile domain (PD). The profile ID may indicate the unique identifier of each profile.

In the description, an eUICC identifier (eUICC ID) may be a unique identifier of the eUICC embedded in the terminal and may be referred to as "EID". When a provisioning profile is installed in the eUICC in advance, the eUICC ID may be the profile ID of the provisioning profile. When the terminal and the eUICC chip are not separated from each other in an embodiment of the present invention, the eUICC ID may refer to the terminal ID. In addition, the eUICC ID may refer to a specific security domain of the eUICC chip.

In the description, a profile container may be referred to as the profile domain. The profile container may be a security domain.

In the description, an application protocol data unit (APDU) may be a message for interworking between the terminal and the eUICC. The APDU may also be a message for interworking between the PP or PM (profile manager) and the eUICC.

In the description, profile provisioning credentials (PPC) may be a means for mutual authentication between the PP and the eUICC, profile encryption, and signing. The PPC may include at least one of a symmetric key, a Rivest Shamir Adleman (RSA) certificate and private key, an elliptic curved cryptography (ECC) certificate and private key, and a root certification authority (root CA) and certificate chain. When multiple PPs are employed, different PMCs may be stored in the eUICC or used for different PPs.

In the description, profile management credentials (PMC) may be a means for mutual authentication between the PM and the eUICC, transmission data encryption, and signing. The PMC may include at least one of a symmetric key, a RSA certificate and private key, an ECC certificate and private key, and a root CA and certificate chain. When multiple PMs are employed, different PMCs may be stored in the eUICC or used for different PMs.

In the description, an AID may be an application identifier. This value may be an identifier distinguishing a specific application from another application inside the eUICC.

In the description, a profile package TLV (tag, length, value) may be referred to as a profile TLV. The profile package TLV may be a set of data representing information constituting a profile in a TLV format.

In the description, an authentication and key agreement (AKA) may indicate an authentication algorithm for accessing 3GPP and 3GPP2 networks.

In the description, 'K' is a cryptographic key value that is stored in the eUICC and used for the AKA authentication algorithm.

In the description, "OPc" is a parameter value that may be stored in the eUICC and used for the AKA authentication algorithm.

In the description, a network access application (NAA) may be an application program stored in the UICC for accessing a network, such as USIM and ISIM. The NAA may be a network access module.

Meanwhile, descriptions of well-known functions and structures incorporated herein may be omitted to avoid obscuring the subject matter of the present invention.

FIG. 1 depicts a procedure for the terminal using a UICC embedding a fixed profile to connect to a mobile communication network.

In FIG. 1, the UICC 120 may be inserted into the terminal 110. Here, the UICC may be removable or may be embedded in the terminal in advance. The fixed profile of the UICC means that the access information permitting access to a particular carrier is fixed. The access information may include a subscriber identifier such as IMSI, and a K value or Ki value required to authenticate the subscriber to the network along with the subscriber identifier.

Thereafter, terminal may use the UICC to perform authentication along with the authentication processing system (e.g. home location register (HLR) or authentication center (AuC)) of the mobile carrier. This authentication process may be an AKA process. If authentication is successful, the terminal may connect to the mobile communication network 130 of the mobile communication system to use a mobile communication service such as a telephone call or mobile data.

Figure 2:
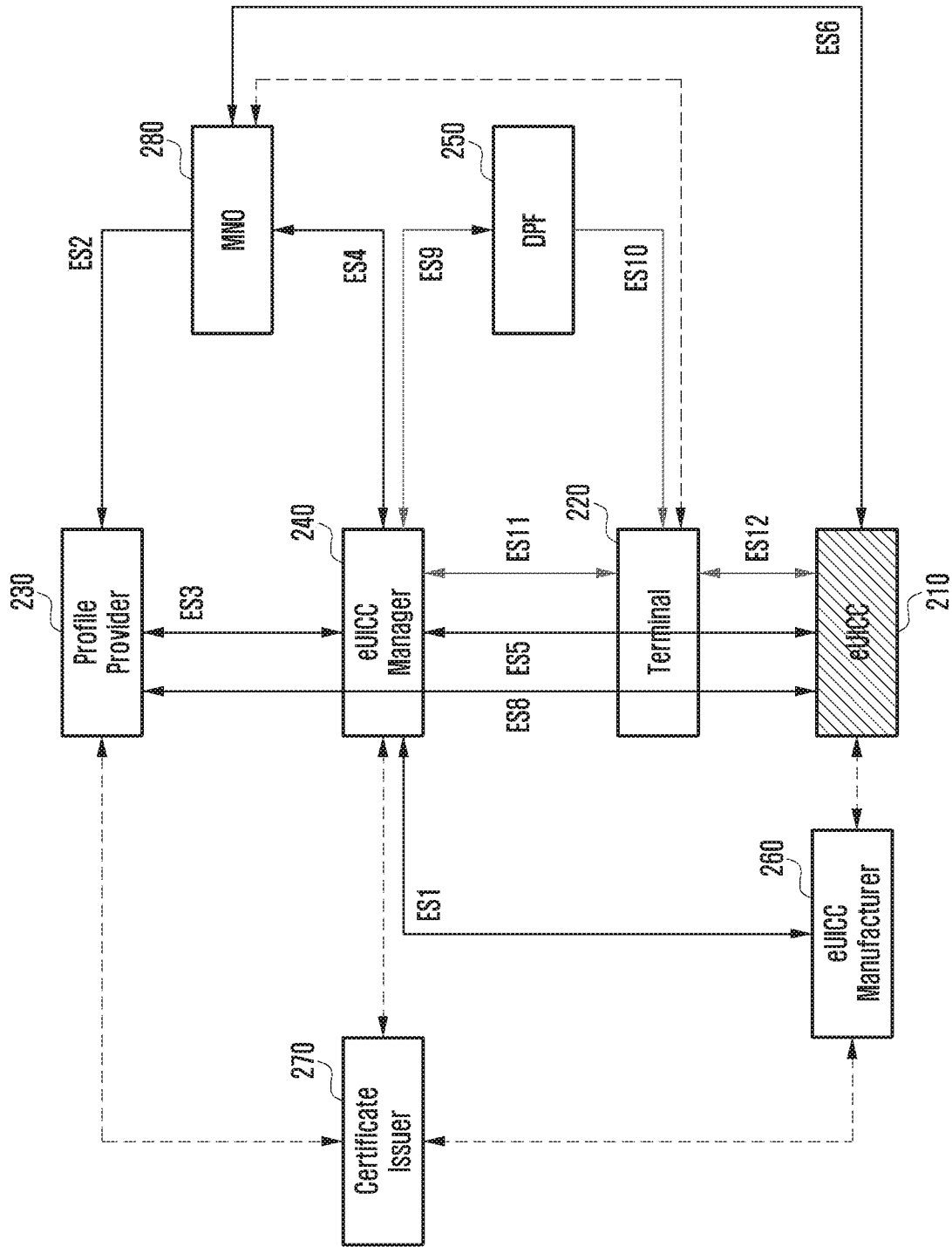
FIG. 2 illustrates a system for remote profile installation and management according to an embodiment of the present invention.

FIG. 2 illustrates a system for remote profile installation and management according to an embodiment of the present invention.

In FIG. 2, the eUICC 210 is a UICC card or chip that can be inserted into or embedded in the terminal 220. It is a UICC with various physical sizes as well as conventional form factors such as 2FF, 3FF, 4FF, MFF1 and MFF2. The eUICC may be embedded as a separate entity, or may be implemented as an integrated part of a communication chip (e.g. baseband modem) of the terminal.

The profile provider 230 may generate a profile or encrypt a generated profile.

The profile provider 230 may also be referred to as SM-DP+.

The eUICC manager 240 may deliver a profile received from the SM-DP+ to the local profile assistant (LPA) of the terminal or perform profile management. The eUICC manager 240 may receive a profile from the SM-SR+. Here, the SM-SR+ may control profile downloading or profile management between the SM-DP+ and the LPA. The SM-DS may receive the SM-SR+ server address and event identifier from the SM-SR+ and forward the same to the LPA. The SM-DP+ and the SM-SR+ may be implemented in one server and may be referred to as SM-DP+ or SM+.

The DPF 250 may deliver profile information to the eUICC manager 240 and/or the terminal 220.

The eUICC manufacturer 260 may manufacture or produce an eUICC and provide the same to the eUICC manager 240.

The certificate issuer 270 may generate or issue a certificate. The certificate issuer may generate or issue information for authenticating a profile and eUICC, or a certificate for authentication.

The mobile network operator (MNO) 280 may be associated with the profile provider 230 and the eUICC manager 240 and manage the profile or the eUICC according to the policy of the mobile communication provider.

Figure 3:
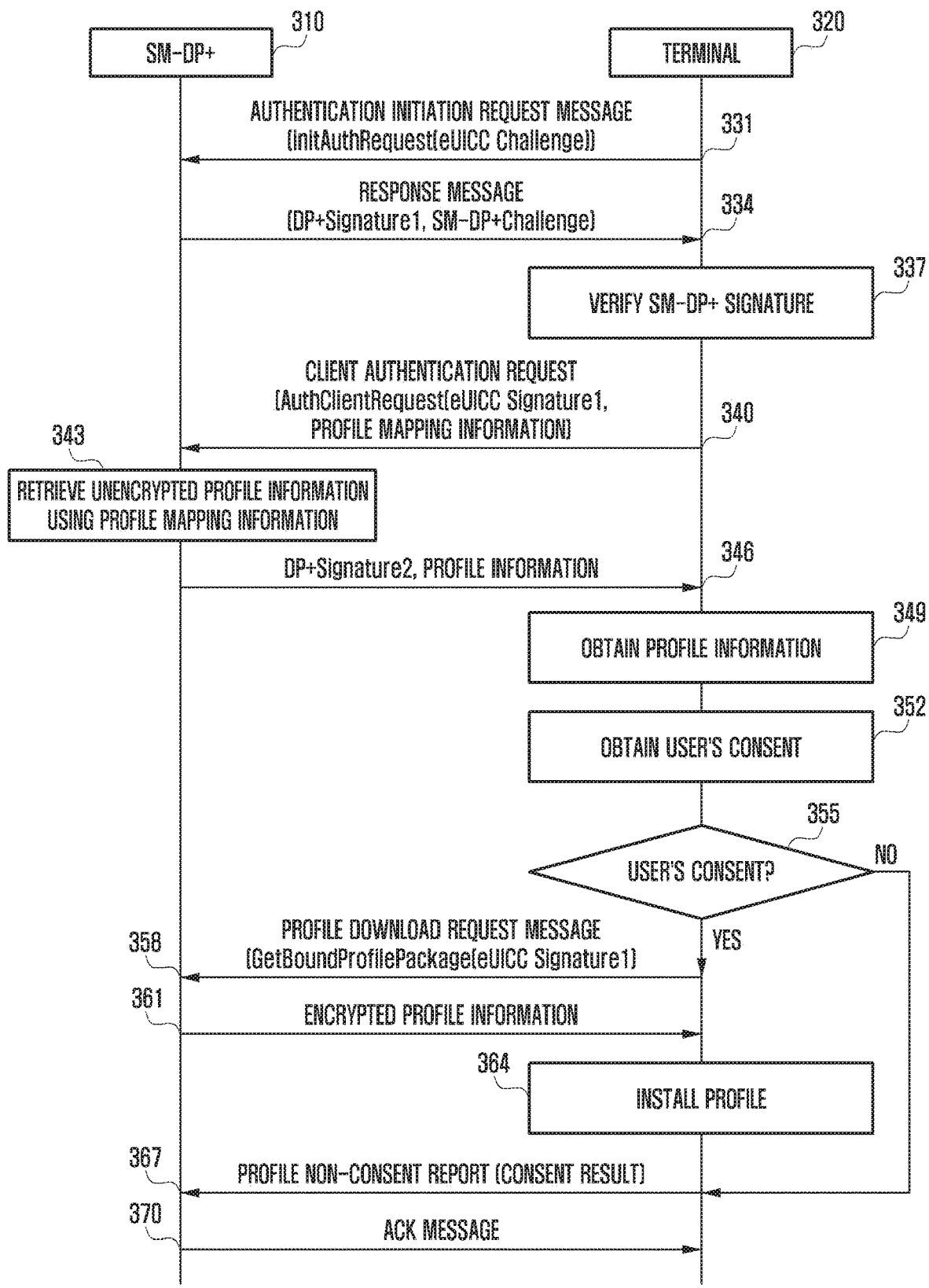
FIG. 3 illustrates a procedure for downloading a profile according to an embodiment of the present invention.

FIG. 3 illustrates a procedure for downloading a profile according to an embodiment of the present invention.

The system of FIG. 3 may include a SM-DP+ 310 and a terminal 320. The SM-DP+ 310 may be a profile provider or a profile providing server. The terminal 320 may include a UICC or eUICC that allows a profile to be downloaded and installed.

At operation 331, the terminal 320 may transmit an authentication initiation request message. The authentication initiation request message may be an InitAuthRequest message. This InitAuthRequest message may be a first request message. The terminal 320 may send an InitAuthRequest message containing a generated challenge to the SM-DP+ 310. The challenge may be a value generated by the eUICC inside or connected to the terminal 320.

At operation 334, the SM-DP+ 310 may calculate SM-DP+ signature 1 for the data including the eUICC challenge and the SM-DP+ challenge generated in the SM-DP+ 310. SM-DP+ signature 1 may be a value calculated using the SM-DP+ private key. Then, the SM-DP+ 310 may transmit a response message containing SM-DP+ signature 1 and SM-DP+ challenge to the terminal 320. This response message may be a first response message.

At operation 337, the terminal 320 may authenticate the SM-DP+ 310. The terminal 320 may verify SM-DP+ signature 1 to authenticate the SM-DP+ 310. If authentication is successful, the procedure may proceed to subsequent operations; and if authentication is unsuccessful, the procedure may be ended.

If SM-DP+ authentication is successful at operation 337, the procedure proceeds to operation 340. At operation 340, the terminal 320 may generate eUICC signature 1 for the data including the SM-DP+ challenge. Here, eUICC signature 1 may be a signature using the private key of the eUICC. The terminal may transmit the SM-DP+a client authentication request (AuthClientRequest) including eUICC signature 1 and profile mapping information. This client authentication request may be a second request message. The profile mapping information collectively refers to information that can be used by the SM-DP+ to identify a specific profile or specific profile type, and may include the following information.

eUICC Identifier or EID
eUICC certificate
EventID
MatchingID
ActivationToken
NotificationID At operation 343, the SM-DP+ 310 may retrieve profile information corresponding to a specific profile or profile type from the profile mapping information.

At operation 346, the SM-DP+ 310 may calculate SM-DP+ signature 2 for the data including the profile information. The SM-DP+ 310 may transmit SM-DP+ signature 2 and the unencrypted profile information to the terminal. The unencrypted profile information may be profile metadata. The profile metadata may include information regarding profile name, icon, ICCID, MSISDN, and communication carrier name.

At operation 349, the terminal 320 can output the received profile information. For example, the terminal 320 may display a portion or the whole of the received profile information on the display unit or may display information mapped to a portion or the whole of the profile information on the display unit. Outputting the profile information is not limited to displaying on the display unit, and various output means such as sound and vibration can be used. The information mapped to the profile information may be pre-stored in the terminal 320 or may be obtained through interworking with an external server. Some or all of the profile information used in the mapping may be as follows.

IMSI
Information including MCC or MNC
Information including MCC and MNC
Carrier name
Information constituting a portion of ICCID information
Carrier code
Profile name, icon information At operation 352, the terminal 320 may obtain user's consent to profile downloading.

The user's consent may be obtained as follows.

"Yes/No" is displayed on the display unit and the position corresponding to "Yes" is input by using an input unit or UI unit (e.g. touch pad).

Input using biometric authentication such as fingerprint recognition

The process of obtaining user's consent is not limited to the above examples, and various schemes for receiving user input in a preset manner may be applied.

At operation 355, the terminal 320 may determine whether profile downloading has obtained the user's consent. If profile downloading has obtained the user's consent, the procedure proceeds to operation 358. If profile downloading has not obtained the user's consent, the procedure proceeds to operation 367.

At operation 358 (with user's consent), the terminal 320 makes a request for profile downloading to the SM-DP+ 310. The terminal 320 may transmit a profile download request message. The profile download request message may be an encrypted message. The profile download request may be a request for full profile information excluding those profile information received at operation 346. The profile download request message may be a GetBoundProfilePackage message. The profile download request message may be a third request message. The profile download request message may contain eUICC signature 2.

At operation 361, the SM-DP+ 310 may send the encrypted profile to the terminal. The SM-DM+ 310 may bind the profile provided to the terminal to the terminal 320. It is possible to prevent the profile from being discarded as the profile is bound after obtaining user's consent.

At operation 364, the terminal 320 may decrypt the encrypted profile and install the decrypted profile. Profile decryption may be performed by the eUICC inside the terminal 320. The encrypted profile may include a portion or the whole of the unencrypted profile received at operation 346. The encrypted profile may be different from those unencrypted information received at operation 346. If the encrypted information and the unencrypted information are not duplicated, the terminal 320 may use (or combine) the encrypted information and the unencrypted information to install the profile.

At operation 367 (without user's consent), the terminal 320 may send a profile non-consent report as the consenting result to the SM-DP+ 310. The terminal 320 may then terminate the profile download procedure.

Upon receiving the profile non-consent report, at operation 370, the SM-DP+ 310 may terminate the profile download procedure and send an ACK message to the terminal 320.

As such, it is possible to efficiently manage the profile. When a generated profile is sent to one terminal from the profile providing server, it cannot be used by another terminal or UICC owing to a security problem. If the terminal does not agree to download the profile after the profile is bound to the terminal in advance by the profile providing server, the profile bound at the server cannot be reused. In the present invention, a portion of the profile information that can be reused by another terminal or UICC may be sent to the terminal 320 without being encrypted. Later, if the terminal 320 agrees with profile downloading on the basis of the unencrypted profile information, the profile providing server may send the encrypted profile information to the terminal 320 to thereby complete transmission of the entire profile. At the time when the encrypted profile is transmitted after reception of the user's consent, the related profile information is bound at the profile providing server. Hence, it is possible to prevent the profile from being discarded after the profile is bound without user's consent.

The profile download process described above may be applied even when the profile process differs somewhat from the above process.

FIG. 4 illustrates a procedure for downloading a profile using a confirmation code according to an embodiment of the present invention.

The system of FIG. 4 may include a SM-DP+ 410 and a terminal 420. The SM-DP+ 410 may be a profile provider or a profile providing server. The terminal 420 may include a UICC or eUICC that allows a profile to be downloaded and installed.

At operation 431, the terminal 420 may transmit an authentication initiation request message. The authentication initiation request message may be an InitAuthRequest message. This InitAuthRequest message may be a first request message. The terminal 420 may send an InitAuthRequest message containing a generated challenge to the SM-DP+ 410. The challenge may be a value generated by the eUICC inside or connected to the terminal 420.

At operation 434, the SM-DP+ 410 may calculate SM-DP+ signature 1 for the data including the eUICC challenge and the SM-DP+ challenge generated in the SM-DP+ 410. SM-DP+ signature 1 may be a value calculated using the SM-DP+ private key. Then, the SM-DP+ 410 may transmit a response message containing SM-DP+ signature 1 and SM-DP+ challenge to the terminal 420. This response message may be a first response message.

At operation 437, the terminal 420 may authenticate the SM-DP+ 410. The terminal 420 may verify SM-DP+ signature 1 to authenticate the SM-DP+ 410. If authentication is successful, the procedure may proceed to subsequent operations; and if authentication is unsuccessful, the procedure may be ended.

If SM-DP+ authentication is successful at operation 437, the procedure proceeds to operation 440. At operation 440, the terminal 320 may generate eUICC signature 1 for the data including the SM-DP+ challenge. Here, eUICC signature 1 may be a signature using the private key of the eUICC. The terminal may transmit the SM-DP+a client authentication request (AuthClientRequest) including eUICC signature 1 and profile mapping information. This client authentication request may be a second request message. The profile mapping information collectively refers to information that can be used by the SM-DP+ to identify a specific profile or specific profile type, and may include the following information.

eUICC Identifier or EID
eUICC certificate
EventID
MatchingID
ActivationToken
NotificationID At operation 443, the SM-DP+ 410 may retrieve profile information corresponding to a specific profile or profile type from the profile mapping information. In addition, the SM-DP+ 410 may check whether information requiring a confirmation code from the user for profile downloading is stored. Whether a confirmation code is needed may be determined according to the policy of the network operator. The network operator may determine in advance whether a confirmation code is required for profile downloading and notify the profile providing server of the determination. The network operator may also provide the profile providing server with a policy that requires a confirmation code in advance. The profile providing server can determine whether a confirmation code is needed on the basis of the policy, and the subscriber information and fee plan of the user requesting a profile. The confirmation code may be composed of numbers, characters, and special characters.

At operation 446, the SM-DP+ 410 may calculate SM-DP+ signature 2 for the data including the profile information. The SM-DP+ 310 may transmit the terminal 420 SM-DP+ signature 2, the unencrypted profile information, and the information indicating necessity of a confirmation code.

At operation 449, the terminal 420 can output the received profile information. For example, the terminal 420 may display a portion or the whole of the received profile information on the display unit or may display information mapped to a portion or the whole of the profile information on the display unit. The information mapped to the profile information may be pre-stored in the terminal 420 or may be obtained through interworking with an external server. Some or all of the profile information used in the mapping may be as follows.

IMSI
Information including MCC or MNC
Information including MCC and MNC
Carrier name
Information constituting a portion of ICCID information
Carrier code
Profile name, icon information At operation 452, the terminal 420 may obtain the user's consent to profile downloading. The user's consent may be obtained as follows.

"Yes/No" is displayed on the display unit and the position corresponding to "Yes" is input by using an input unit or UI unit (e.g. touch pad)
Input using biometric authentication such as fingerprint recognition Upon determining that a confirmation code is necessary on the basis of the information indicating necessity of a confirmation code received from the SM-DP+, the terminal may display a confirmation code input request and receive a confirmation code through the user interface (UI) at the same time as, separately from, or without the user consent acquisition operation. Then, the terminal 420 may perform a hash operation using the confirmation code input by the user and the SM-DP+ challenge received at operation 434. The hash operation may be executed more than once; the confirmation code may be hidden through the hash operation; and the SM-DP+ challenge used in the computation may cause each hash operation to produce a different hash value. The hash operation may be executed separately by one or more CPUs. For example, a portion of the computation may be performed by the application processor (AP) and the remaining computation may be performed by the modem or eUICC, heightening the security level. The confirmation code may be received from the network carrier.

The user may receive confirmation code information from the network carrier upon subscription. Information about the confirmation code may be obtained in various ways such as email and bar code.

At operation 455, the terminal 420 may determine whether the user has consented to profile downloading. If the user has consented to profile downloading, the procedure proceeds to operation 458. If the user has not consented to profile downloading, the procedure proceeds to operation 467.

At operation 358 (with user's consent), the terminal 420 makes a request for profile downloading to the SM-DP+ 410. The terminal 420 may transmit a profile download request message. The profile download request message may include the hashed confirmation code. The profile download request message may be an encrypted message. The profile download request may be a request for full profile information excluding those profile information received at operation 446. The profile download request message may be a GetBoundProfilePackage message. The profile download request message may be a third request message. The profile download request message may contain eUICC signature 2.

At operation 459, the SM-DP+ 410 may verify the profile download request. The SM-DP+ 410 may perform the verification in the following way.

First, the SM-DP+ 410 checks whether a hashed confirmation code is present in the profile download request message received from the terminal 420. If a hashed confirmation code is not present in the profile download request message, the procedure proceeds to operation 465 at which the SM-DP+ 410 may send a message (NACK message) indicating that no hashed confirmation code is present in the profile download request message.

If a hashed confirmation code is present in the profile download request message from the terminal 420, the SM-DP+ 410 may directly compute a hashed confirmation code for comparison. As the hashed confirmation code is generated based on the challenge generated by the SM-DP+ 410, the SM-DP+ 410 may newly compute a hashed confirmation code for comparison. However, other entities are unable to perform such comparison since they do not know the challenge used to generate the hashed confirmation code. If the hashed confirmation code received from the terminal 420 is identical to the hashed confirmation code computed by the SM-DP+ 410, the procedure proceeds to operation 461. Otherwise, the SM-DP+ 410 may send a message indicating profile download failure to the terminal 420 and terminate the procedure.

At operation 461, the SM-DP+ 410 may send the encrypted profile to the terminal 420. The SM-DM+ 410 may bind the profile provided to the terminal to the terminal 420. It is possible to prevent the profile from being discarded since the profile is bound after obtaining the user's consent.

At operation 464, the terminal 420 may decrypt the encrypted profile and install the decrypted profile. Profile decryption may be performed by the eUICC inside the terminal 420.

At operation 467 (without user's consent), the terminal 420 may send a profile non-consent report as the consenting result to the SM-DP+ 410. The terminal 420 may then terminate the profile download procedure.

Upon receiving the profile non-consent report, at operation 470, the SM-DP+ 410 may terminate the profile download procedure and send an ACK message to the terminal 420.

As such, it is possible to efficiently manage the profile. The profile download process described above may be applied even when the profile process differs somewhat from the above process.

Figure 5A:
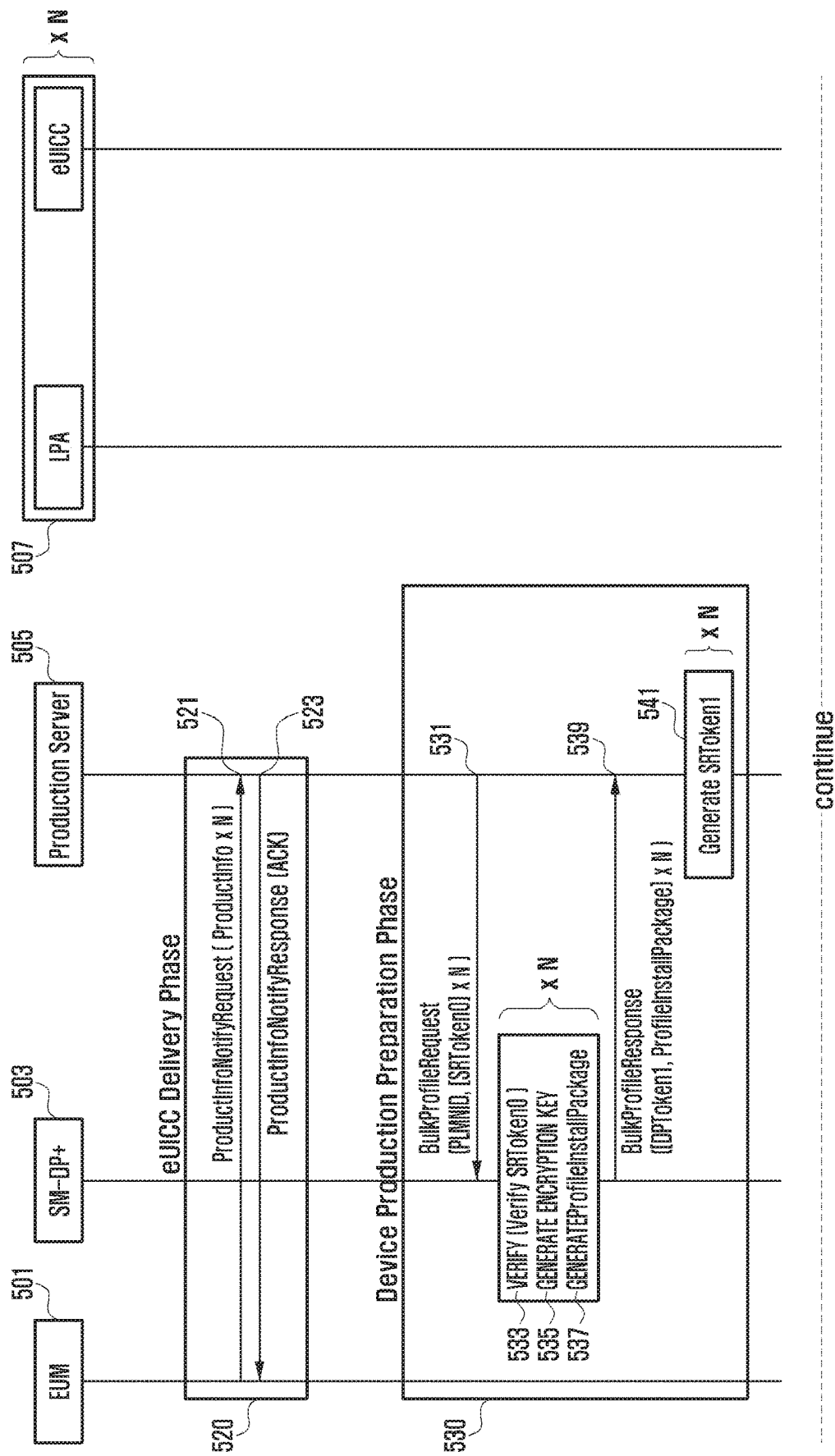
FIGS. 5A to 5C depict a scheme for provisioning a large number of terminals with profiles at one time according to an embodiment of the present invention.
Figure 5B:
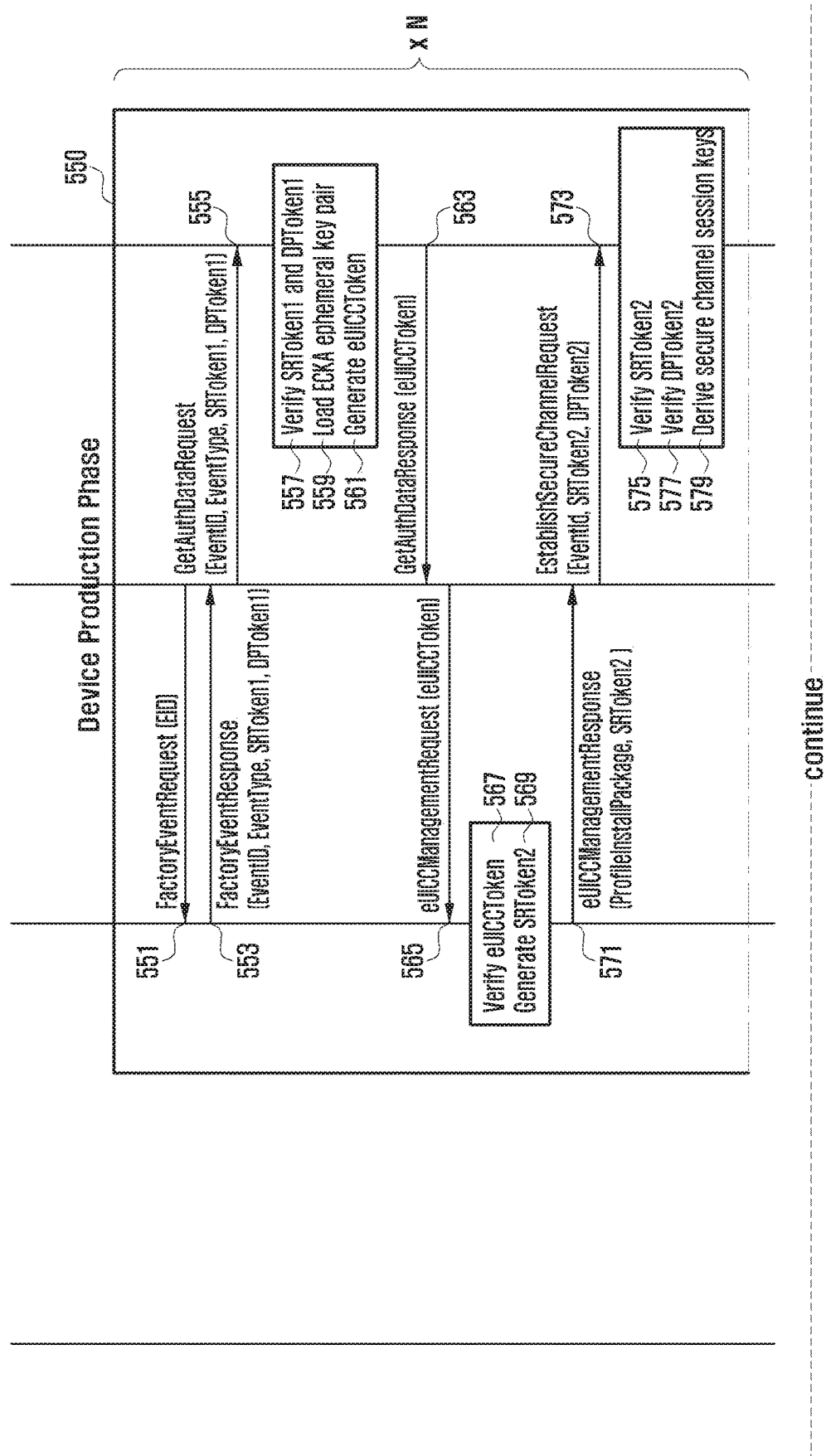
Figure 5C:
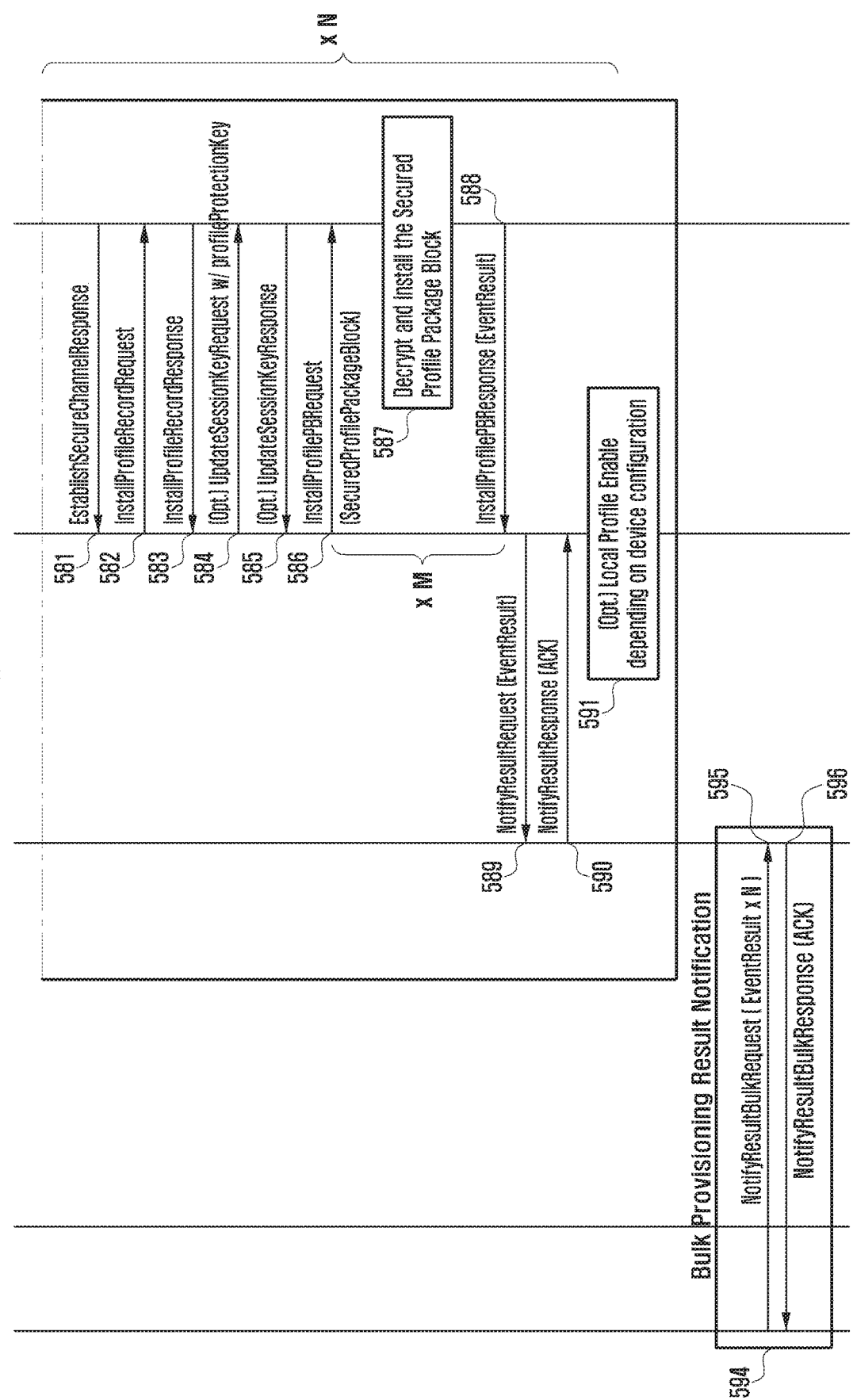

FIGS. 5A to 5C depict a scheme for provisioning a large number of terminals with profiles at one time according to an embodiment of the present invention. In the case of downloading profiles to plural terminals, it may be inefficient to obtain user's consent or to receive a confirmation code for each terminal. The embodiment of FIG. 5 provides a method for downloading profiles to multiple terminals. The embodiment of FIG. 5 may be applied to the embodiment of FIG. 3 or 4 when there are multiple terminals.

A description is given of an efficient scheme for installing many profiles in many terminals with reference to FIG. 5.

The large-scale profile installation process may be broadly divided into an eUICC delivery phase 520, a device production preparation phase 530, a device production phase 550, and a bulk provisioning result notification phase 594.

First, a description is given of the eUICC delivery phase 520.

At operation 521, the production server 505 may receive product information for N eUICCs from the eUICC manufacturer (EUM) 501. A ProductionInfoNotifyRequest message can be used to provide the product information for N eUICCs.

The eUICC may be configured to perform the following operations for a given production server 505. There are two ways for this.

- The identifier of the production server 505 is set in advance when the EUM 501 manufactures eUICCs
- A specific credential is sent to the production server 505 and the eUICC performs a specific operation only for a request with the credential The above information may include eUICC information, eUICC certificate, one-time public key generated in advance, and EUM certificate. A credential may also be delivered as described above. The one-time public key generated in advance may be used in the eUICC only via a specific product server.

At operation 523, the production server 505 may send a response message to the EUM 501. The response message may be a ProductionInfoNotifyResponse message. The response message may include an ACK or NACK indication to reception of the product information.

Next, in the device production preparation phase 530,

At operation 531, the production server 505 may make a profile download preparation request to the SM-DP+ 503. The production server 505 may make a profile download preparation request to the SM-DP+ 503 by transmitting a BulkProfileRequest message. Here, the BulkProfileRequest message may include the following information.

- Profile type identifier
- Certificate and signature of production server
- N eUICC certificates, N one-time public keys, N versions of eUICC information The N pieces of information may be transmitted to the SM-DP+ in a form that they can be mapped to each other for the same eUICC.

The signature may apply to a value containing a one-time public key.

At operation 533, the SM-DP+ 503 may verify the certificate and signature of the production server 505 (verify SR Token0). If the verification is successful, the procedure proceeds to operation 535 at which the SM-DP+ 503 may generate an encryption key. The SM-DP+ 503 can generate a one-time asymmetric key pair and use the same together with the received public key to generate an encryption key. The encryption key may be used to encrypt the profile or to encrypt the symmetric key used to encrypt the profile.

At operation 537, the SM-DP+ 503 may generate a profile package. The SM-DP+ 503 may generate N pieces of data including an encrypted profile, a one-time public key generated by the SM-DP+, and a SM-DP+ signature.

At operation 539, the SM-DP+ 503 may send the generated profile package to the production server 505. The profile package may include token information (DPToken1) and profile package installation information (profile install package) for each eUICC. For n eUICCs, n pieces of token information and n pieces of profile package installation information can be included. The SM-DP+ 503 may utilize a BulkProfileResponse message.

At operation 541, the production server 505 may compute a production server signature for a portion or the whole of the data received from the SM-DP+ 503. This signature may be a value prepared in advance by the production server 505 or may be a signature using the specific credential received from the EUM 501 as described in connection to operation 521.

Next, a description is given of the device production phase. Although one terminal 507 among n terminals is described below as an example, the operations of the device production phase described below can be performed for each of the n terminals.

At operation 551, one terminal 507 may request the production server 505 to install a profile when a specific condition is satisfied. The terminal 507 may use a FactoryEventRequest message to make a profile installation request.

The condition may be as follows.
  Reception of a command via a wired or wireless connection
  Reception of a command via manual manipulation
  Reaching a specific time point
  Passing a specific location Here, the LPA of the terminal 507 may receive a challenge from the eUICC of the terminal 507 before sending the FactoryEventRequest message.

The FactoryEventRequest message may include at least one of an EID and eUICC challenge.

If a eUICC challenge is included, the eUICC challenge may be included in the computation of the signature of the production server 505 at operation 341.

At operation 553, the production server 505 may send a response message (factory event response) to the terminal 507. The production server 505 may send the LPA of the terminal 507 a response message including the signature of the SM-DP+ 503 and the signature of the production server 505.

At operation 555, the LPA may send the eUICC a profile installation preparation message containing the SM-DP+ signature and the production server signature. The profile installation preparation message may be a GetAuthDataRequest message, and may include EventID, EventType, SRToken 1, and DPToken 1. In addition, the terminal 507 may present an indication and UI for requesting user's consent before requesting the eUICC to prepare for profile installation. However, if profile installation is performed via a specific server (i.e. production server 505), the user consent process can be omitted.

At operation 557, the eUICC may verify the production server signature. For example, the eUICC may verify SRToken 1 for the production server. If the verification is successful, the eUICC may verify the SM-DP+ signature. For example, the eUICC may verify DPToken 1 for the SM-DP+. If any one of the verifications fails, the eUICC may return an error and terminate the procedure without further processing.

At operation 559, the eUICC may verify that the production server 505 is a designated server. For example, the eUICC may check the ID or signature of the production server. If the production server 505 is an authorized production server, the eUICC can use a one-time asymmetric key pair generated in advance without newly generating a one-time asymmetric key pair.

At operation 561, the eUICC may generate an eUICC signature (eUICCToken) for the data including the one-time public key and the parameters received from the LPA by using the private key for signing preset in the eUICC.

At operation 563, the eUICC may then send the data including the eUICC signature and the one-time public key to the LPA. Here, a GetAuthDataResponse message may be used.

At operation 565, the LPA may transmit the production server 505 a profile download request message including the received eUICC signature and the one-time public key. The profile download request message may be a eUICCManagementRequest message, and may include eUICCToken.

At operation 567, the production server 505 may verify the eUICC signature (eUICCToken). If the verification fails, the production server 505 may return an error and terminate the following profile installation process for the corresponding terminal.

At operation 569, the production server 505 can sign (SRToken2) for a portion or the whole of the encrypted profile received at operation 539 by using the signing private key of the production server 505. The encrypted profile may include another signature of the SM-DP+ 503.

At operation 571, the production server 505 may send the encrypted profile and the production server signature to the LPA in return for operation 565. Here, a eUICCmanagementResponse message may be used, and it may include profileinstallpackage and SRToken2.

At operation 573, the LPA may send the eUICC a signature singed using the SM-DP+ signing private key for the production server signature, the SM-DP+ one-time public key, and data including the SM-DP+ one-time public key. Here, an EstablishSecureChannelRequest message may be used, and it may include EventId, SRToken2, and DPToken2.

At operation 575, the eUICC may verify the signature of the production server (SRToken2). If the verification fails, the eUICC may return an error to the LPA and terminate the following profile installation process.

Upon successful verification of the production server signature, at operation 577, the eUICC may verify the signature of the SM-DP+ (DPToken2). If the verification fails, the eUICC may return an error and terminate the following profile installation process.

Upon successful verification of the SM-DP+ signature, at operation 579, the eUICC may generate an encryption key by using the one-time public key of the SM-DP+ received from the LPA and the one-time private key of the eUICC.

At operation 581, the eUICC may send the response for operation 573 to the LPA of the terminal 507. Here, an EstablishSecureChannelResponse message may be used.

At operation 582, the LPA may send the encrypted ProfileRecord information to the eUICC. Here, an InstallProfileRecordRequest message may be used.

At operation 583, the eUICC may decrypt the encrypted ProfileRecord using the encryption key generated at operation 579 and install the decrypted ProfileRecord. Then, the eUICC may send the corresponding response to the LPA. Here, an InstallProfileRecordResponse message may be used.

Selectively, at operation 584, the LPA may send an encrypted profile protection key (PPK) to the eUICC. Here, an UpdateSessionKeyRequest message with ProfileProtectionKey may be used.

At operation 585, the eUICC may decrypt the encrypted PPK using the encryption key generated at operation 579, and then send a corresponding response message to the LPA. Here, an UpdateSessionKeyResponse message may be used.

At operation 586, the LPA sends an encrypted profile package block to the eUICC. Here, an IntallProfilePBRequest message may be used, and it may include SecuredProfilePackageBlock.

At operation 587, the eUICC may decrypt the encrypted profile package block by using the encryption key of operation 579 or the PPK of operation 585. If the decryption fails, the eUICC may return an error code and terminate the following profile installation process. If the decryption is successful, the eUICC may check whether at least one profile element (installable unit) is configurable by using the decrypted profile package block separately or by combining it with a portion or the whole of the previous profile package block. If installable profile elements are configured, the eUICC may install the profile elements. If a portion or the whole of the decrypted profile package block is left after configuring an installable profile element, the remaining portion may be stored in the buffer so that it can be combined with a portion or the whole of the next profile package block to constitute a new profile element.

At operation 588, the eUICC may send a response for operation 586 to the LPA. Here, an InstallProfilePBResponse message may be used, and it may include EventResult.

If there are M encrypted profile package blocks, operations 586 to 588 can be repeated M times.

When the first to last profile package blocks have been successfully installed, the eUICC may send a profile installation complete message including a eUICC signature to the LPA.

After profile installation completion, at operation 589, the LPA may send an installation completion notification message including the eUICC signature to the production server 505. The LPA may use a NotifyResultRequest message, which may contain EventResult. At operation 590, the production server 505 may send a NotifyResultResponse message to the LPA as a response to operation 589.

Optionally, at operation 591, the LPA can enable the profile installed in the eUICC.

Operations 551 to 591 are performed for one terminal. For profile downloading and installation in N terminals, the above operations can be performed for each of the N terminals.

At operation 595, the production server 505 may send the profile download result for N terminals to the SM-DP+ 503 by using a NotifyResultBulkRequest message. At operation 596, the SM-DP+ 503 may send a NotifyResultBulkResponse message to the production server 505.

Figure 6A:
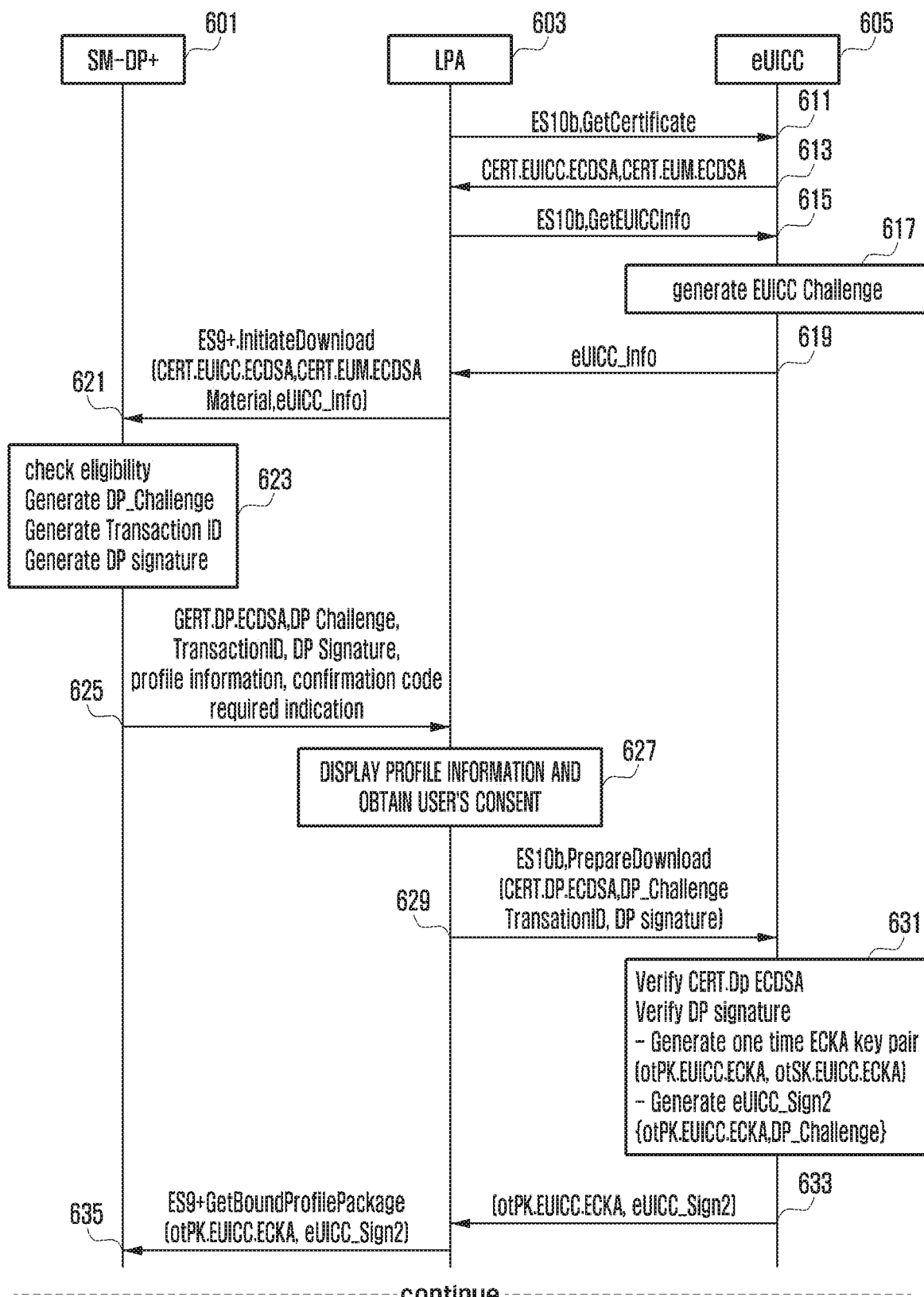
FIGS. 6A and 6B illustrate a procedure for downloading a profile according to an embodiment of the present invention.
Figure 6B:
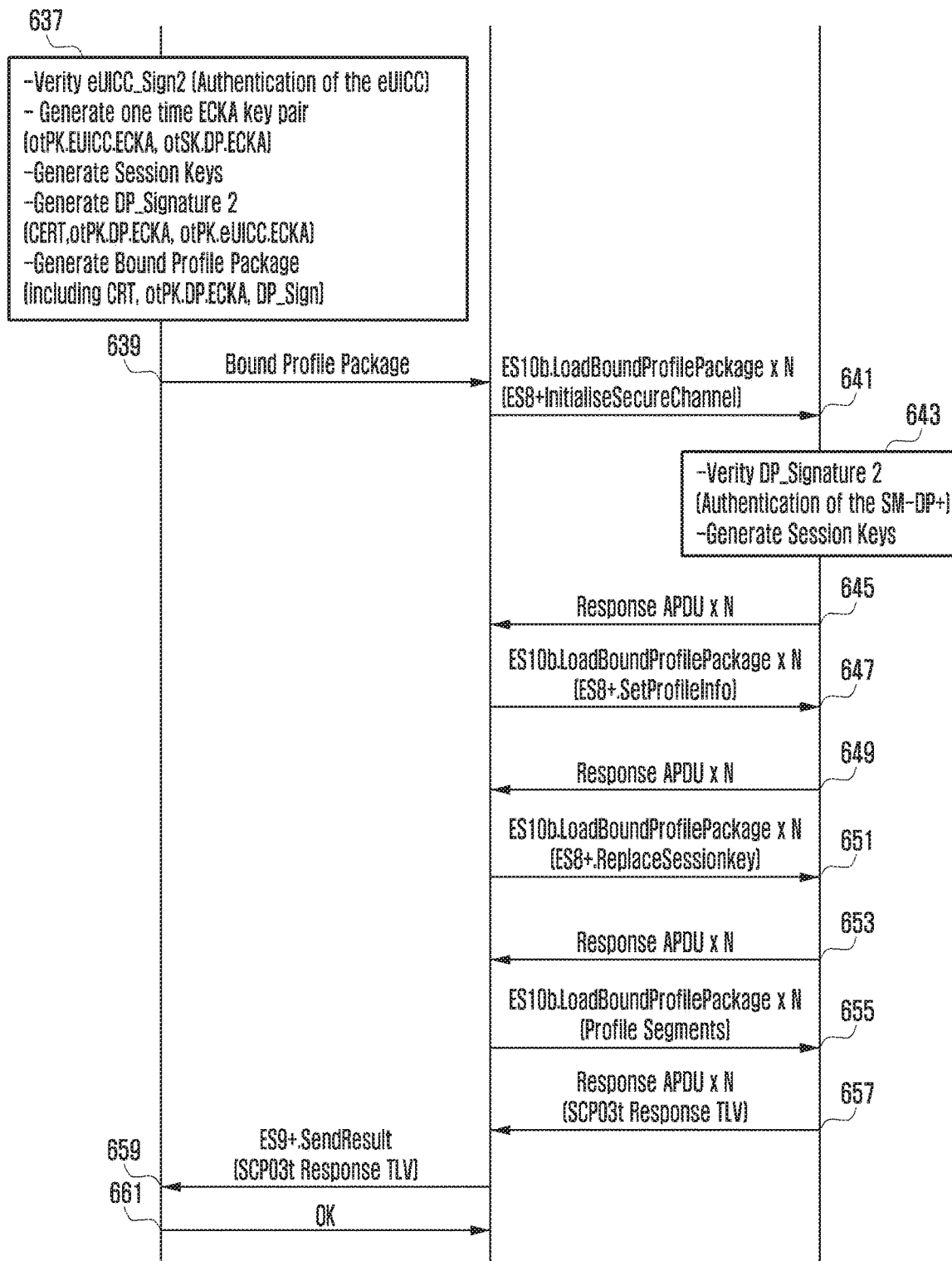

FIG. 6 illustrates a procedure for downloading a profile according to another embodiment of the present invention.

In FIG. 6, the SM-DP+ 601 can communicate directly with the LPA 603 without SM-SR+ by using general IP-based HTTPS. The LPA 603 and the eUICC 605 may be included in the terminal. The communication between the LPA 603 and the SM-DP+ 601 may be understood as the communication between the terminal and the SM-DP+ 601.

The SM-DP+ 601 stores the signing certificate (CERT.DP.ECDSA) and the private key (SK.DP.ECDSA) thereof in the internal storage. The SM-DP+ 601 also stores the TLS server certificate (CERT.DP.TLS) and the private key (SK.DP.TLS) for HTTPS in the internal storage. The internal storage storing CERT.DP.ECDSA and SK.DP.ECDSA may be physically the same storage as or a different storage from that storing CERT.DP.TLS and SK.DP.TLS.

The eUICC 605 stores the signing certificate (CERT.EUICC.ECDSA) and the private key (SK.eUICC.ECDSA) thereof in the internal storage. Next, a description is given of a profile download process.

At operation 611, the LPA 603 makes a request for an eUICC certificate to the eUICC. The LPA may use ES10b.getCertificate. at operation 613, the eUICC 605 returns an eUICC certificate (CERT.eUICC.ECDSA) and an EUM certificate (CERT.EUM.ECDSA) to the LPA 603. The eUICC 605 may use CERT.EUICC.ECDSA and CERT.EM.ECDSA.

If the above certificates are already stored in the LPA, operations 611 and 613 may be skipped.

To deliver an eUICC signature to the server, at operation 615, the LPA 603 may request the eUICC 605 to generate a signature. The LPA 603 may use ES10b.GetEUICCInfo. Here, the parameters for the signature delivered from the LPA 603 may include one or more of the flowing values.

EventID (identifier of a profile download event)
NotificationID (similar to EventID)
MatchingID (similar to EventID)
Activation Code Token (similar to EventID)
Random value generated by the terminal If the signature of the eUICC is not necessary, the LPA 603 may issue a request for the eUICC information (eUICC Info) excluding the eUICC signature of operation 615.

Thereafter, at operation 617, the eUICC 605 may generate a signature using SK.eUICC.ECDSA. The eUICC 605 may generate a eUICC challenge.

At operation 619, the eUICC 605 may return the eUICC signature to the LPA 603. If the eUICC signature is not needed, only eUICC_Info can be returned. Here, eUICC Info may include version information of the eUICC.

At operation 621, the LPA 603 may invoke ES9+.InitiateDownload to the SM-DP+ 601. Before invoking ES9+.InitiateDownload, an HTTPS session is established between the LPA and the SM-DP+. The HTTPS session may be the same session during the profile download process or may be a separate session. ES9+.InitiateDownload may be ES9.InitiateAuthentication or ES9.EventRequest. ES9+.InitiateDownload may include eUICC Info and further include the eUICC challenge. If ES9+.InitiateDownload includes the eUICC signature, it may also include the eUICC certificate and EUM certificate.

Upon reception of the eUICC certificate and signature, at operation 623, the SM-DP+ 601 may verify the EUM certificate using the CI certificate or CI certificate public key (PK.CI.ECDSA), verify the eUICC certificate using the EUM certificate, and verify the eUICC signature using the eUICC certificate. Here, certificate verification and signature verification may be skipped.

The SM-DP+ 601 can check the eligibility of the eUICC 605 based on eUICC Info (eligibility check in the drawing). Here, the version information of eUICC Info may be utilized.

The SM-DP+ 601 may generate a DP challenge. The DP challenge is used later by the SM-DP+ 601 to authenticate the eUICC.

The SM-DP+ 601 may generate TransactionID. TransactionID is an identifier of a specific profile download session enabling the SM-DP+ 601 to simultaneously process multiple requests from multiple terminals. When download sessions are not distinguished by TransactionIDs, the SM-DP+ 601 can download a profile to only one terminal at a time. Additionally, if a specific terminal delays the response while interworking with the SM-DP+ 601, the other terminal cannot download a profile. To solve this problem, the server may place a lifetime limit on download sessions and delete a specific download session after expiration of a given lifetime. However, in this case, the server will also experience a performance problem.

If the SM-DP+ 601 receives MatchingID or EID from the LPA 603, it may check whether there is a profile to be downloaded corresponding to MatchingID or EID.

The SM-DP+ 601 calculates the DP signature using SK.DP.ECDSA for the data including the eUICC challenge, DP challenge, and TransactionID. The DP signature may be used by the eUICC to authenticate the SM-DP+.

At operation 625, as a response to operation 621, the SM-DP+ 601 may send SM-DP+ signing certificate (CERT.DP.ECDSA), DP challenge, TransactionID, DP signature, profile information, and confirmation code required indication (ConfirmationCodeRequired indication).

At operation 627, the terminal may display the profile information. The profile information may be output in various ways. The terminal (including the LPA) can receive user's consent to profile downloading. In addition, the terminal can receive a confirmation code if necessary.

At operation 629, the LPA 603 may send ES10b.PrepareDownload to the eUICC 605. ES10b.PrepareDownload may be ES10.GetAuthDataRequest. ES10b.PrepareDownload may include CERT.DP.ECDSA, DP challenge, TransactionID, and DP signature.

At operation 631, the eUICC 605 verifies the DP certificate (CERT.DP.ECDSA) first by using the CI certificate stored in the eUICC or the CI public key.

Upon successful verification of the DP certificate, the eUICC 605 may verify the SM-DP+ signature (DP signature).

Here, the SM-DP+ signature may be verified by using the DP challenge and TransactionID received from the LPA 603, the eUICC challenge sent by the eUICC 605 to the LPA 603, and SM-DP+ public key (PK.DP.ECDSA) contained in CERT.DP.ECDSA.

Upon successful verification, the eUICC may generate a one-time asymmetric key pair.

The eUICC may load and use the one-time asymmetric key pair generated in advance in the following cases.
  Requested by designated SM-DP+ server
  Requested by terminal via separate indicator The one-time asymmetric key pair may be used to generate an encryption key between the SM-DP+ 601 and the eUICC 605 together with the one-time asymmetric key pair of the server. The encryption key may be generated in the following ways.
  The SM-DP+ 601 generates the encryption key by combining the one-time private key of the SM-DP+ and the one-time public key of the eUICC
  The eUICC 605 generates the encryption key by combining the one-time private key of the eUICC and the one-time public key of the SM-DP+

Additional parameters necessary for encryption key generation may be transmitted from the SM-DP+ 601 to the eUICC 605 via the LPA 603 at a later operation.

The eUICC 605 generates a eUICC signature (eUICC_Sign2) using the eUICC signing private key (SK.eUICC.ECDSA) for the data including the one-time public key (otPK.EUICC.ECKA) of the generated one-time asymmetric key pair and the DP challenge. As eUICC_Sign2 computation includes the DP challenge generated by the SM-DP+, eUICC_Sign2 may be used by the SM-DP+ 601 to authenticate the eUICC 605 at a later operation. In addition, eUICC Sign2 allows the otPK.eUICC.ECKA value generated by the eUICC 605 to be delivered to the SM-DP+ without being altered.

At operation 633, the eUICC 605 sends the generated one-time public key (otPK.EUICC.ECKA) of the eUICC and the generated eUICC signature (eUICC_Sign2) to the LPA 603. At operation 635, the LPA 603 may send ES9+ GetBoundProfilePackage to the SM-DP+ 601. ES9+GetBoundProfilePackage may be referred to as eUICCManagementRequest or ProfileRequest.

ES9+GetBoundProfilePackage may include the eUICC one-time public key and the eUICC signature. Additionally, the eUICC signing certificate (CERT.eUICC.ECDSA) for eUICC signature verification and the EUM certificate (CERT.eUICC.ECDSA) for verifying the eUICC signing certificate can be delivered.

Further, the following values, which can be used as a mapping identifier for downloading a specific profile, may be delivered.
  EventID
  MatchingID
  NotificationID
  Activation code token The mapping identifier may be not transmitted when it is transmitted at a preceding operation (i.e. operation 621).

The terminal may also send a hashed confirmation code to the SM-DP+.

In operation 637, the SM-DP+ 601 may verify the EUM certificate and the eUICC certificate in a manner described at operation 623 above.

The SM-DP+ 601 may verify the eUICC signature (eUICC Sign2) by using the eUICC one-time public key received from the LPA 603 at operation 635, the DP challenge sent to the LPA 603 at operation 625, and the public key included in the eUICC certificate. If the verification is successful, the SM-DP+ 601 has authenticated the eUICC 605. If the verification is unsuccessful, the SM-DP+ 601 may stop an operation on the corresponding session and return an error to the LPA 603.

The SM-DP+ 601 may map EventID (NotificationID, MatchingID, or Activation code token) received at operation 635 to the profile to be downloaded. If there is no profile to be downloaded, the SM-DP+ 601 may return an error and terminate the corresponding session.

The SM-DP+ 605 may generate a one-time asymmetric key pair. The generated one-time asymmetric key pair may be used to generate an encryption key between the eUICC 605 and the SM-DP+ 601. The encryption key may be generated in the following ways.
  The SM-DP+ 601 generates the encryption key by combining the one-time private key of the SM-DP+ and the one-time private key of the eUICC
  The eUICC 605 generates the encryption key by combining the one-time private key of the eUICC and the one-time public key of the SM-DP+

The SM-DP+ 601 may calculate the SM-DP+ signature (DP Signature2). This SM-DP+ signature is computed for the data including the CRT, SM-DP+ one-time public key, eUICC one-time public key, and TransactionID by using the SM-DP+ signing private key (SK.DP.ECDSA). The CRT may be used as a parameter for encryption key generation.

The SM-DP+ 601 may generate a bound profile package (BPP) bound to a specific eUICC. The BPP may include the CRT, SM-DP+ one-time public key, and DP Signature2.

The BPP may include ProfileInfo (or MetaData) encrypted by the encryption key. The BPP may include a profile protection key (PPK) encrypted by the encryption key. The BPP may include profile package blocks (PPB) encrypted by the encryption key or PPK. Here, the entire profile data may be divided into installable units (profile element or PE), and the PEs may be encrypted to form the encrypted PPBs with an encryptable size. The SCP03t protocol may be used for such encryption.

At operation 639, the SM-DP+ 601 returns the BPP in response to operation 635.

At operation 641, the LPA may perform ES10b.LoadBoundProfilePackage multiple times to transfer the ES8_InitializeSecureChannel information contained in the BPP to the eUICC. The ES8_InitilizaseSecureChannel information may include the CRT, SM-DP+ one-time public key, and DP Signature2. ES8_InitilizaseSecureChannel may be referred to as EstablishSecureChannel. ES10b.LoadBoundProfilePackage may carry a StoreData command At operation 643, the eUICC 605 may verify the DP signature (DP Signature2) first by using the public key (PK.DP.ECDSA) of the DP signing certificate (CERT.DP.ECDSA) received at operation 629, the CRT and SM-DP+ one-time public key received at operation 641, and the eUICC one-time public key sent to the LPA 603 at operation 633.

If the verification fails, the eUICC 605 may return an error to the LPA 603 and does not perform the following process.

If the verification is successful, the eUICC 605 may generate an encryption key by using the CRT, eUICC one-time private key, and SM-DP+ one-time public key.

At operation 645, the eUICC 605 may send the result of verification performed at operation 643 to the LPA 603.

At operation 647, the LPA 603 may perform ES10b.LoadBoundProfilePackage multiple times to transfer the ES8+SetProfileInfo information contained in the BPP to the eUICC. ES8+SetProfileInfo may be referred to as ES8+.StoreMetadata or InstallProfileRecord. ES8+SetProfileInfo may include ProfileInfo (or Metadata or ProfileRecord). At operation 649, the eUICC 605 sends the LPA 603 the response resulting from operation 647.

If ES8+ReplaceSessionKey is contained in the received BPP, at operation 651, the LPA 603 may perform ES10b.LoadBoundProfilePackage multiple times to transfer the ES8+ReplaceSessionKeys information contained in the BPP to the eUICC 605. ES8+ReplaceSessionKeys may be referred to as UpdateSessionKeyRequest.

ES8+ReplaceSessionKeys includes the profile protection key (PPK) encrypted by the encryption key of operation 637. At operation 653, the eUICC 605 sends the LPA 603 the response resulting from operation 651.

At operation 655, the LPA 603 may perform ES10b.LoadBoundProfilePackage multiple times to transfer the profile package blocks (PPBs) or profile segments contained in the BPP to the eUICC 605. Each profile segment is decrypted using the encryption key or PPK and processed in order in the eUICC 605.

After processing all profile segments, at operation 657, the eUICC 605 may calculate the eUICC signature and send the same to the LPA 603.

At operation 659, the LPA 603 may send the corresponding signature to the SM-DP+ 601 to notify the profile installation result. At operation 661, the SM-DP+ 601 may send the LPA 603 the response resulting from operation 659.

Figure 7A:
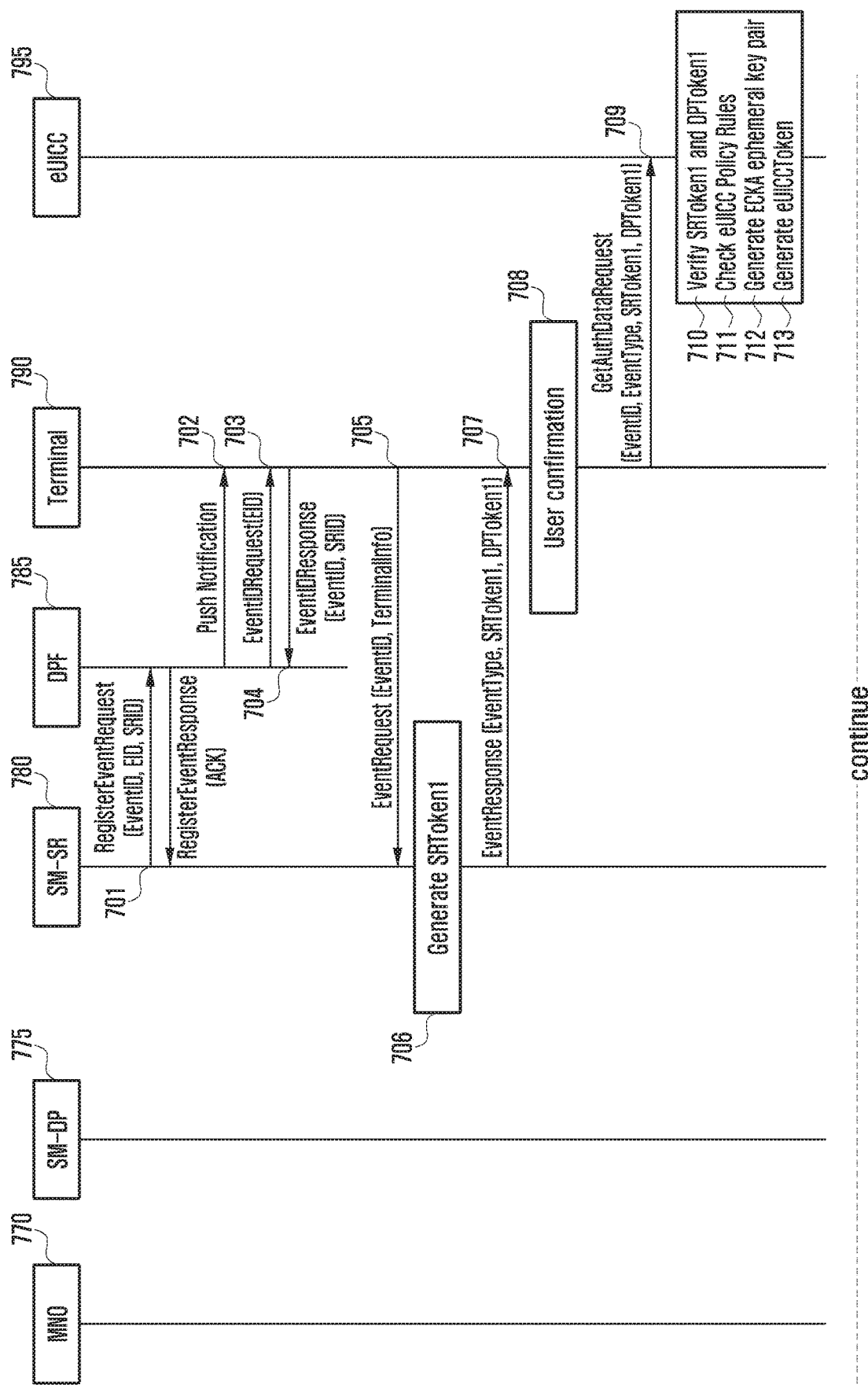
Figure 7C:
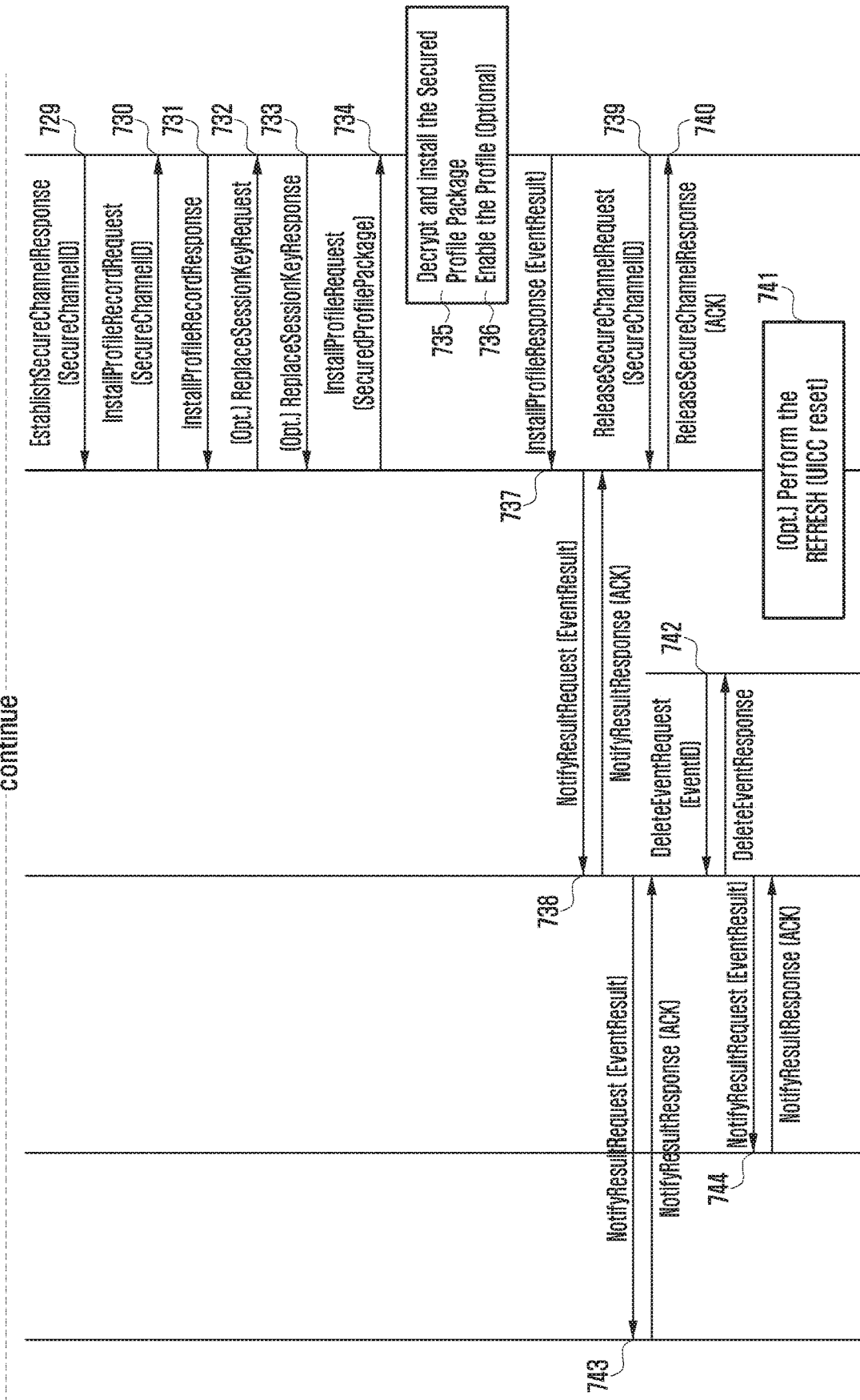

FIG. 7 illustrates a procedure for downloading a profile according to another embodiment of the present invention.

In FIG. 7, at operation 701, the SM-SR 780 may send RegisterEventRequest to the DPF 785. RegisterEventRequest may include an Event ID, EID, and SRID. The DPF 785 may store the Event ID, EID and SRID, and may send RegisterEventResponse to the SM-SR 780. At operation 702, the DPF 785 may send a push notification to the terminal 790. The push notification may be sent through a push server.

At operation 703, the terminal 790 may send ES10_EventRequest to the DPF 785. EventRequest may include an EID.

At operation 704, the DPF 785 may send EventIDResponse to the terminal 790. EventIDResponse may include an EventID and SRID.

At operation 705, the terminal 790 may send EventRequest to the SM-SR 780. EventRequest may include an EventID and terminalInfo.

After receiving EventResponse at operation 704, if at least one event is pending, at operation 705, the terminal 790 may transmit EventRequest.

At operation 706, the SM-SR 780 may generate SRToken1 in response to operation 705.

At operation 707, the SM-SR 780 may send EventResponse to the terminal 790. EventResponse may include Eventtype, SRToken1, and DPToken1.

At operation 708, the terminal 790 may obtain user's approval. The terminal 790 can display a user consent request, and the user may enter an input for the user's consent to profile downloading. When confirmation code input is necessary, the input means for receiving the confirmation code can be displayed, and the confirmation code can be received from the user. The confirmation code may be information that the user obtains from the MNO 770 or the network carrier when subscribing to the service.

At operation 709, the terminal 790 may send GetAuthDataRequest to the eUICC 795. GetAuthDataRequest may include an EventID, EventType, SRToken1, and DPToken1.

At operation 710, the eUICC 795 may verify SRToken1 and DPToken1. At operation 711, the eUICC 795 may examine the eUICC policy rule. At operation 712, the eUICC 795 may generate an ECKA ephemeral key pair. At operation 713, the eUICC 795 may generate eUICCToken.

At operation 714, the eUICC 795 may send GetAuthDataResponse to the terminal 790. GetAuthDataResponse may include eUICCToken.

At operation 715, the terminal 790 may send eUICCManagementRequest to the SM-SR 780. eUICCManagementRequest may include eUICCToken.

At operation 716, the SM-SR 780 may verify the received eUICCToken. If the verification fails, an error may be returned to terminal 790. If the verification is successful, the eUICC is successfully authenticated by the SM-SR.

At operation 717, the SM-SR 780 may send ProfileRequest to the SM-DP 775. ProfileRequest may include eUICCToken, NONCE SR, and terminalInfo.

At operation 718, the SM-DP 775 may verify eUICCToken. At operation 719, the SM-DP 775 may generate an ECKA ephemeral key pair. At operation 720, the SM-DP 775 may derive a secure channel session key. At operation 721, the SM-DP 776 may generate profileInstallPackage.

At 722 operation, the SM-DP 775 may send ProfileResponse to the SM-SR 780. ProfileResponse may include ProfileInstallPackage.

At operation 723, the SM-SR 780 may generate SRToken2.

At operation 724, the SM-SR 780 may send eUICCManagementResponse to the terminal 790. eUICCManagementResponse may include ProfileInstallPackage and SRToken2.

At operation 725, the terminal 790 may send EstablishSecureChannelRequest to the eUICC 795. EstablishSecureChannelRequest may include EventID, SRToken2, and DPToken2.

At operation 726, the eUICC 795 may verify SRToken2. If the verification is successful, at operation 727, the eUICC 795 may verify DPToken2. If the verification is successful, at operation 728, the eUICC 795 may obtain a secure channel session key.

At operation 729, the eUICC 795 may send EstablishSecureChannelResponse to the terminal 790. EstablishSecureChannelResponse may include a SecureChannelID. At operation 730, the terminal 790 may send InstallProfileRecordRequest to the eUICC 795. InstallProfileRecordRequest may include a secureChannelID.

At operation 731, the eUICC 795 may send InstallProfileRecordResponse to the terminal 790.

Operations 732 and 733 may be optionally performed. At operation 732, the terminal 790 may send ReplaceSessionKeyRequest to the eUICC 795. At operation 733, the eUICC 795 may send ReplaceSessionKeyResponse to the terminal 790.

At operation 734, the terminal 790 may send InstallProfileRequest to the eUICC 795. InstallProfileRequest may include an encrypted profile package.

At operation 735, the eUICC 795 may receive the encrypted profile package, decrypt the encrypted profile package, and install the decrypted profile package. Optionally, at operation 736, the eUICC 795 may activate the installed profile.

At operation 737, the eUICC 795 may send InstallProfileResponse to the terminal 790. InstallProfileResponse may include EventResult.

At operation 738, the terminal 790 may send NotifyResultRequest to the SM-SR 780 to report EventResult, and the SM-SR 780 may send NotifyResultResponse to the terminal 790.

At operation 739, the terminal 790 may send ReleaseSecureChannelRequest to the eUICC 795. ReleaseSecureChannelRequest may include a SecureChannelID. At operation 740, the eUICC 795 may send ReleaseSecuredChannelResponse to the terminal 790.

Optionally, at operation 741, the terminal may reset the UICC.

At operation 742, the SM-SR 780 may send DeleteEventRequest to the DPF 785. DeleteEventRequest may include an EventID. The DPF 785 may delete the corresponding event and send DeleteEventResponse to SM-SR 780.

At operation 743, the SM-SR 780 may send NotifyResultRequest to the MNO 770. NotifyResultRequest may include EventResult. The MNO 770 may send NotifyResultResponse to the SM-SR 780.

At operation 744, the SM-SR 780 may send NotifyResultRequest to the SM-DP 775. NotifyResultRequest may include EventResult. The SM-DP 775 may send NotifyResultResponse to the SM-SR 780.

The following is an example of representing the necessity of user consent and the confirmation code required indication transmitted from the SM-DP+ to the terminal in an embodiment of the present invention. The configuration of the confirmation code required indication below can be applied to the embodiment using a confirmation code among the embodiments of the present invention.

```
UserConfirmation ::= SEQUENCE {
confirmType ConfirmType,
confirmMessage ConfirmMessage OPTIONAL
}
ConfirmType ::= ENUMERATED { yesOrNo (0), codeInput (1) }
ConfirmMessage ::= UTF8String
```

The UserConfirmation data of the above example may be sent from the SM-DP+ to the terminal separately or along with other data. The ConfirmType contained in the UserConfirmation may have the following values.

If ConfirmType is set to 0, this indicates "yesOrNo". In this case, the terminal may select whether to obtain user's consent to profile downloading as shown in the drawings. If ConfirmType is set to 1, this indicates that "codeInput" is required (i.e. the confirmation code input is required).

In addition, the confirmation message can be additional information that the terminal presents to the user, and the information thereof can be composed differently for different network carriers.

Figure 8:
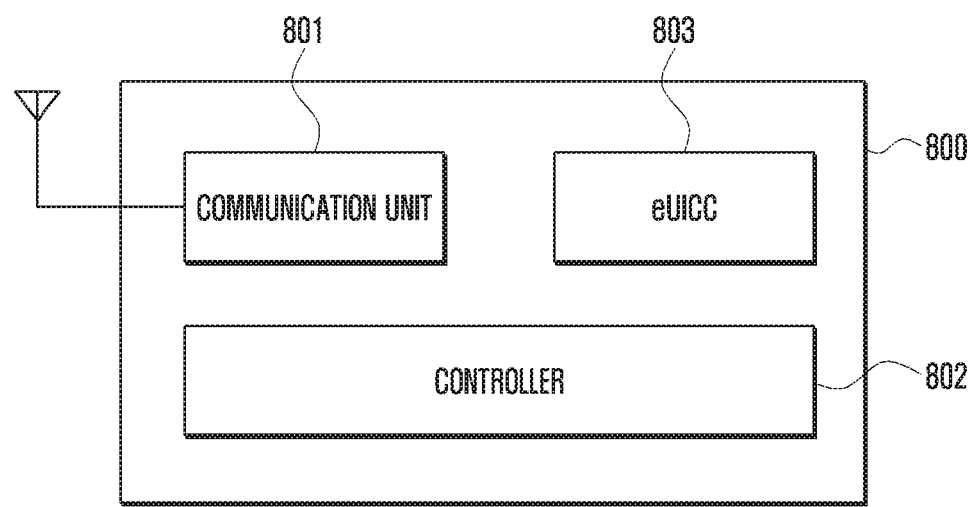
FIG. 8 illustrates a terminal according to an embodiment of the present invention.

FIG. 8 illustrates a terminal according to an embodiment of the present invention.

With reference to FIG. 8, the terminal 800 may include a communication unit 801, a controller 802, and a eUICC 803.

The communication unit 801 may send and receive data. The communication unit 801 may send a message generated by the eUICC 803 to an external device outside the terminal 800. The communication unit 801 may be referred to as a transceiver, and may include at least one of a transmitter and a receiver.

The eUICC 803 is a chip-type security module embedded in the terminal 800, and it cannot be inserted into and detached from the terminal 800. The eUICC 803 can download and install a profile using the over-the-air (OTA) technology.

In one embodiment, the controller 802 may control transmitting a first profile download request to a profile providing server, receiving unencrypted first profile information from the profile providing server, checking whether there is an input for consenting to profile downloading after receiving unencrypted profile information, and determining whether to download an encrypted profile on the basis of the check result.

If there is an input for consenting, the controller 802 may control transmitting a second profile download request to the profile providing server, and receiving encrypted second profile information from the profile providing server.

The controller 802 may control installing a profile on the basis of the unencrypted first profile information and the encrypted second profile information.

The controller 802 may control checking whether a confirmation code is input after receiving the unencrypted first profile information, and transmitting the second profile download request if a confirmation code is input.

The unencrypted first profile information may include information regarding at least one of profile name, icon, ICCID, MSISDN, and communication carrier.

The terminal 800 can perform not only the operations of the embodiment of FIG. 8 but also the operations of the terminal, LPA, eUICC, and UICC described in connection with FIGS. 1 to 8. The controller 802 may control the terminal 800 to perform the above operations.

Figure 9:
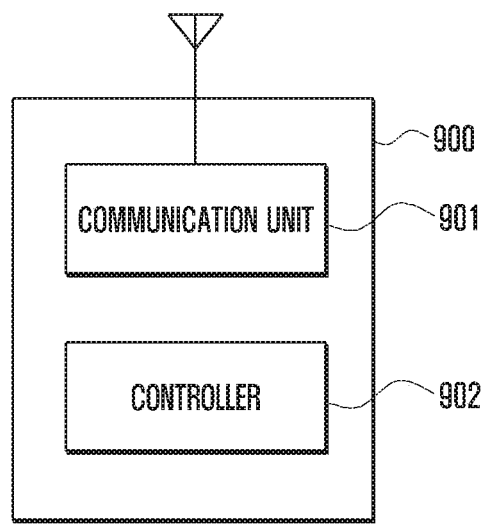
FIG. 9 illustrates a profile providing server according to an embodiment of the present invention.

FIG. 9 illustrates a profile providing server according to an embodiment of the present invention.

The profile providing server 900 may be the SM-DP+ and/or the SM-SR. The profile providing server may operate as a server including a communication unit 901 and a controller 902. Although not shown, the profile providing server may include a separate storage unit capable of storing information related to the profile. The storage unit may be included in the controller 902. The profile providing server may further include various modules (not shown) capable of performing various functions. These modules may be operated by an integrated controller, or may operate as separate entities.

The communication unit 901 may send and receive data. The communication unit 901 may be referred to as a transceiver, and may include at least one of a transmitter and a receiver.

The controller 902 may control the overall operation of the server, and may process various data and information sent and received through the communication unit 901.

In one embodiment, the controller 902 may control receiving a first profile download request, transmitting unencrypted first profile information to a terminal, receiving a second profile download request including information indicating user's consent to profile downloading from the terminal, and transmitting encrypted second profile information to the terminal.

The controller 902 may control checking whether a confirmation code is required for profile downloading, transmitting, if a confirmation code is required, information requesting a confirmation code along with transmission of the first profile information, and transmitting, if a confirmation code is included in the second profile download request, the encrypted second profile information.

When the second profile download request is received from the terminal, the controller 902 may process the profile related to the first profile information and the second profile information so that the profile cannot be used by another terminal.

The unencrypted first profile information may include information regarding at least one of profile name, icon, ICCID, MSISDN, and communication carrier.

The profile providing server 900 can perform not only the operations of the embodiment of FIG. 9 but also the operations of the profile providing server, SM-DP+, and SM-SR described in connection with FIGS. 1 to 8. The controller 902 may control the profile providing server 900 to perform the above operations.

In the above embodiments of the present invention, the elements included in the invention are expressed in a singular or plural form according to the proposed specific embodiment. However, the singular or plural expression is appropriately selected for ease of description according to the presented situation, and the present invention is not limited to a single element or plural elements. Those elements described in a plural form may be configured as a single element, and those elements described in a singular form may be configured as plural elements.

Although various embodiments of the present invention have been described in detail hereinabove, it should be understood that many variations and modifications of the basic inventive concept described herein will still fall within the spirit and scope of the present invention as defined in the appended claims and their equivalents.

What is claimed is:

1. A method performed by a terminal in a wireless communication system, the method comprising:
   transmitting, to a profile providing server, a first message including a universal integrated circuit card (UICC) challenge;
   receiving, from the profile providing server, a second message including a profile providing server challenge and a first signature associated with the profile providing server, wherein the first signature associated with the profile providing server is computed using a private key of the profile providing server for data including the profile providing server challenge and the UICC challenge;
   verifying the first signature associated with the profile providing server;
   transmitting, to the profile providing server, a third message including a second signature of the UICC of the terminal, the profile providing server challenge, and profile mapping information, in case that the first signature associated with the profile providing server is successfully verified, wherein the second signature of the UICC of the terminal is computed based on data including the profile providing server challenge and the profile mapping information;
   receiving, from the profile providing server, a fourth message including profile metadata corresponding to the profile mapping information and a third signature of the profile providing server;
   transmitting, to the profile providing server, a fifth message for requesting a profile package, wherein the fifth message includes a fourth signature of the UICC of the terminal; and
   receiving, from the profile providing server, a sixth message including an encrypted profile package and information included in the profile metadata.

2. The method of claim 1, further comprising:
   displaying information included in the profile metadata; and
   identifying whether a user input for downloading the profile package is obtained.

3. The method of claim 2,
   wherein the fifth message is transmitted to the profile providing server in case that the user input indicating a consent for downloading the profile package is obtained, and
   wherein a profile download procedure is cancelled in case that the user input indicating the consent for downloading the profile package is not obtained.

4. The method of claim 1,
   wherein the profile mapping information includes at least one of an identity (ID) of the UICC, an Event ID, a Matching ID, or an activation code, wherein the profile metadata includes at least one of a profile name, an icon, an integrated circuit card identity (ICCID), or an operator name, and
   wherein the ICCID corresponds to an identifier of the profile package.

5. The method of claim 1,
   wherein the profile providing server corresponds to a Subscription Manager Data Preparation plus (SM-DP+), and
   wherein the fifth message corresponds to a get bound profile package message.

6. A method performed by a profile providing server in a wireless communication system, the method comprising:
receiving, from a terminal, a first message including a universal integrated circuit card (UICC) challenge;
transmitting, to the terminal, a second message including a profile providing server challenge and a first signature associated with the profile providing server, wherein the first signature associated with the profile providing server is computed using a private key of the profile providing server for data including the profile providing server challenge and the UICC challenge;
receiving, from the terminal, a third message including a second signature of a UICC of the terminal, the profile providing server challenge, and profile mapping information, in case that the first signature associated with the profile providing server is successfully verified, wherein the second signature of the UICC of the terminal is computed based on data including the profile providing server challenge and the profile mapping information;
verifying a profile based on the profile mapping information;
transmitting, to the terminal, a fourth message including profile metadata of the verified profile and a third signature of the profile providing server;
receiving, from the terminal, a fifth message for requesting a profile package, wherein the fifth message includes a fourth signature of the UICC of the terminal; and
transmitting, to the terminal, a sixth message including an encrypted profile package and information included in the profile metadata.

7. The method of claim 6, further comprising:
binding the profile as a response to the fifth message.

8. The method of claim 6,
wherein the fifth message is received from the terminal in case that a user input indicating a consent for downloading the profile package is obtained, and
wherein a profile download procedure is cancelled in case that the user input indicating the consent for downloading the profile package is not obtained.

9. The method of claim 6,
wherein the profile mapping information includes at least one of an identity (ID) of the UICC, an Event ID, a Matching ID, or an activation code,
wherein the profile metadata includes at least one of a profile name, an icon, an integrated circuit card identity (ICCID), or an operator name, and
wherein the ICCID corresponds to an identifier of the profile package.

10. The method of claim 6,
wherein the profile providing server corresponds to a Subscription Manager Data Preparation plus (SM-DP+), and
wherein the fifth message corresponds to a get bound profile package message.

11. A terminal in a wireless communication system, the terminal comprising:
a transceiver; and
a controller configured to:
transmit, to a profile providing server via the transceiver, a first message including a universal integrated circuit card (UICC) challenge,
receive, from the profile providing server via the transceiver, a second message including a profile providing server challenge and a first signature associated with the profile providing server, wherein the first signature associated with the profile providing server is computed using a private key of the profile providing server for data including the profile providing server challenge and the UICC challenge,
verify the first signature associated with the profile providing server,
transmit, to the profile providing server via the transceiver, a third message including a second signature of the UICC of the terminal, the profile providing server challenge, and profile mapping information, in case that the first signature associated with the profile providing server is successfully verified, wherein the second signature of the UICC of the terminal is computed based on data including the profile providing server challenge and the profile mapping information,
receive, from the profile providing server via the transceiver, a fourth message including profile metadata corresponding to the profile mapping information and a third signature of the profile providing server,
transmit, to the profile providing server via the transceiver, a fifth message for requesting a profile package, wherein the fifth message includes a fourth signature of the UICC of the terminal, and
receive, from the profile providing server via the transceiver, a sixth message including an encrypted profile package and information included in the profile metadata.

12. The terminal of claim 11, wherein the controller is further configured to:
display information included in the profile metadata, and
identify whether a user input for downloading the profile package is obtained.

13. The terminal of claim 12,
wherein the fifth message is transmitted to the profile providing server in case that the user input indicating a consent for downloading the profile package is obtained, and
wherein a profile download procedure is cancelled in case that the user input indicating the consent for downloading the profile package is not obtained.

14. The terminal of claim 11,
wherein the profile mapping information includes at least one of an identity (ID) of the UICC, an Event ID, a Matching ID, or an activation code,
wherein the profile metadata includes at least one of a profile name, an icon, an integrated circuit card identity (ICCID), or an operator name, and
wherein the ICCID corresponds to an identifier of the profile package.

15. The terminal of claim 11,
wherein the profile providing server corresponds to a Subscription Manager Data Preparation plus (SM-DP+), and
wherein the fifth message corresponds to a get bound profile package message.

16. A profile providing server in a wireless communication system, the profile providing server comprising:
a transceiver; and
a controller configured to:
receive, from a terminal via the transceiver, a first message including a universal integrated circuit card (UICC) challenge,
transmit, to the terminal via the transceiver, a second message including a profile providing server challenge and a first signature associated with the profile providing server, wherein the first signature associated with the profile providing server is computed using a private key of the profile providing server for data including the profile providing server challenge and the UICC challenge, receive, from the terminal via the transceiver, a third message including a second signature of a UICC of the terminal, the profile providing server challenge, and profile mapping information, in case that the first signature associated with the profile providing server is successfully verified, wherein the second signature of the UICC of the terminal is computed based on data including the profile providing server challenge and the profile mapping information, verify a profile based on the profile mapping information, transmit, to the terminal via the transceiver, a fourth message including profile metadata of the verified profile and a third signature of the profile providing server, receive, from the terminal via the transceiver, a fifth message for requesting a profile package, wherein the fifth message includes a fourth signature of the UICC of the terminal, and transmit, to the terminal via the transceiver, a sixth message including an encrypted profile package and information included in the profile metadata.

17. The profile providing server of claim 16, wherein the controller is further configured to bind the profile as a response to the fifth message.

18. The profile providing server of claim 16,
wherein the fifth message is received from the terminal in case that a user input indicating a consent for downloading the profile package is obtained, and
wherein a profile download procedure is cancelled in case that the user input indicating the consent for downloading the profile package is not obtained.

19. The profile providing server of claim 16,
wherein the profile mapping information includes at least one of an identity (ID) of the UICC, an Event ID, a Matching ID, or an activation code,
wherein the profile metadata includes at least one of a profile name, an icon, an integrated circuit card identity (ICCID), or an operator name, and
wherein the ICCID corresponds to an identifier of the profile package.

20. The profile providing server of claim 16,
wherein the profile providing server corresponds to a Subscription Manager Data Preparation plus (SM-DP+), and
wherein the fifth message corresponds to a get bound profile package message.

* * * * *